(12) United States Patent
Li et al.

(10) Patent No.: US 10,932,636 B2
(45) Date of Patent: Mar. 2, 2021

(54) AUTONOMOUS CLEANING DEVICE

(71) Applicants: BEIJING XIAOMI MOBILE SOFTWARE CO., LTD., Beijing (CN); BEIJING ROCKROBO TECHNOLOGY CO., LTD., Beijing (CN)

(72) Inventors: Xing Li, Beijing (CN); Zitao Wang, Beijing (CN); Zhijun Li, Beijing (CN); Yongfeng Xia, Beijing (CN)

(73) Assignees: BEIJING XIAOMI MOBILE SOFTWARE CO., LTD., Beijing (CN); BEIJING ROCKROBO TECHNOLOGY CO., LTD., Beijing (CN)

(*) Notice: Subject to any disclaimer, the term of this patent is extended or adjusted under 35 U.S.C. 154(b) by 237 days.

(21) Appl. No.: 15/485,237

(22) Filed: Apr. 12, 2017

(65) Prior Publication Data

US 2017/0296021 A1 Oct. 19, 2017

(30) Foreign Application Priority Data

Apr. 14, 2016 (CN) .......................... 201610232698.9

(51) Int. Cl.
*A47L 9/28* (2006.01)
*A47L 11/24* (2006.01)
(Continued)

(52) U.S. Cl.
CPC ............... *A47L 9/2852* (2013.01); *A47L 5/22* (2013.01); *A47L 5/30* (2013.01); *A47L 9/009* (2013.01);
(Continued)

(58) Field of Classification Search
CPC ........ A47L 9/2852; A47L 5/22; A47L 9/0477; A47L 9/0411; A47L 9/009; A47L 9/1409;
(Continued)

(56) References Cited

U.S. PATENT DOCUMENTS 6,883,201 B2 * 4/2005 Jones .................... A47L 5/30
15/319
7,761,954 B2 * 7/2010 Ziegler ................. A47L 5/14
15/320
(Continued)

FOREIGN PATENT DOCUMENTS

CN 1642465 A 7/2005
CN 2780370 Y 5/2006
(Continued)

OTHER PUBLICATIONS

ISR and written opinions for PCT application CN2016108611 dated Jan. 26, 2017.
(Continued)

*Primary Examiner* — Orlando E Aviles
*Assistant Examiner* — Robert F Neibaur
(74) *Attorney, Agent, or Firm* — Jun He Law Offices P.C.; James J. Zhu

(57) ABSTRACT

An autonomous cleaning device is provided. The autonomous cleaning device includes: a device body; and a drive module, a cleaning module and a sensing module, wherein the drive module, the cleaning module and the sensing module are detachably assembled to the device body, respectively.

15 Claims, 15 Drawing Sheets

(51) Int. Cl.
| | |
|---|---|
| *A47L 5/30* | (2006.01) |
| *A47L 11/40* | (2006.01) |
| *A47L 5/22* | (2006.01) |
| *A47L 9/00* | (2006.01) |
| *A47L 9/04* | (2006.01) |
| *A47L 9/12* | (2006.01) |
| *A47L 9/14* | (2006.01) |
| *G05D 1/00* | (2006.01) |
| *G05D 1/02* | (2020.01) |

(52) U.S. Cl.
CPC ........... *A47L 9/0411* (2013.01); *A47L 9/0477* (2013.01); *A47L 9/122* (2013.01); *A47L 9/1409* (2013.01); *A47L 9/2826* (2013.01); *A47L 9/2831* (2013.01); *A47L 9/2847* (2013.01); *A47L 9/2857* (2013.01); *A47L 9/2884* (2013.01); *A47L 9/2889* (2013.01); *A47L 11/24* (2013.01); *A47L 11/4011* (2013.01); *A47L 11/4041* (2013.01); *A47L 11/4061* (2013.01); *A47L 11/4072* (2013.01); *G05D 1/0088* (2013.01); *G05D 1/0238* (2013.01); *G05D 1/0242* (2013.01); *G05D 1/0259* (2013.01); *A47L 2201/00* (2013.01); *A47L 2201/04* (2013.01); *A47L 2201/06* (2013.01); *G05D 2201/0215* (2013.01)

(58) Field of Classification Search
CPC .... A47L 9/2826; A47L 9/2831; A47L 9/2847; A47L 9/122; A47L 9/2884; A47L 9/2889; A47L 9/2857; A47L 11/4072; A47L 5/30; A47L 11/24; A47L 11/4011; A47L 11/4041; A47L 2207/00; A47L 2201/04; A47L 2201/06; G05D 1/0238; G05D 1/0259; G05D 1/0242; G05D 1/0088; G05D 2201/0215; H05K 1/0272
USPC .................................................. 15/319, 339
See application file for complete search history.

(56) References Cited

U.S. PATENT DOCUMENTS

| | | | | |
|---|---|---|---|---|
| 8,239,992 | B2 * | 8/2012 | Schnittman | A47L 11/34 |
| | | | | 15/41.1 |
| 8,584,307 | B2 * | 11/2013 | Won | A47L 5/30 |
| | | | | 15/319 |
| 9,293,670 | B2 * | 3/2016 | Toita | H01L 33/58 |
| 9,572,467 | B2 * | 2/2017 | Dyson | A47L 9/122 |
| 9,924,845 | B2 * | 3/2018 | Dyson | A47L 7/00 |
| 10,117,553 | B2 * | 11/2018 | Eriksson | A47L 9/02 |
| 2005/0015913 | A1 | 1/2005 | Kim et al. | |
| 2014/0237757 | A1 * | 8/2014 | Conrad | A47L 9/16 |
| | | | | 15/344 |
| 2014/0366300 | A1 * | 12/2014 | Eriksson | A47L 9/00 |
| | | | | 15/246.2 |

FOREIGN PATENT DOCUMENTS

| | | |
|---|---|---|
| CN | 201782706 U | 4/2011 |
| CN | 102083352 A | 6/2011 |
| CN | 202005711 U | 10/2011 |
| CN | 203662684 U | 6/2014 |
| CN | 204260674 U | 4/2015 |
| CN | 104708625 A | 6/2015 |
| CN | 104714219 A | 6/2015 |
| CN | 204612006 U | 9/2015 |
| CN | 105982611 A | 10/2016 |
| EP | 1969438 B1 | 9/2009 |
| EP | 3000369 A1 | 3/2016 |

OTHER PUBLICATIONS

The Second Office Action in the priority application No. 201610232698. 9, dated Jul. 30, 2018.
Extended European Search Report for European application No. 17165931.1, dated Sep. 12, 2017.

\* cited by examiner

AUTONOMOUS CLEANING DEVICE

This application is based on and claims priority to Chinese Patent Application No. 201610232698.9, filed to the State Intellectual Property Office of P. R. China on Apr. 14, 2016, the entire contents of which are incorporated herein by reference.

TECHNICAL FIELD

The present disclosure relates to a field of intelligent cleaning technology, and more particularly, to an autonomous cleaning device.

BACKGROUND

With the rapid development of communication technology, application of intelligent products in the daily life becomes increasingly common, and a variety of autonomous cleaning devices have emerged, such as autonomous sweeping devices, autonomous mopping devices and so on. The autonomous cleaning devices may execute cleaning operations automatically, which brings convenience to users. However, as the function of an autonomous cleaning device gradually becomes strong, functional modules of the autonomous cleaning device increase and an internal structure thereof becomes more and more complex, such that when the autonomous cleaning device breaks down and needs repair, disassembling time and difficulty of a single machine are increased greatly, causing difficulties to maintenance personnel.

Since defects of a random sweeping mode become troublesome and hard to ignore, sweepers capable of navigation sweeping have an increasing market share, and more and more sweepers with a distance measuring unit, a photographing unit and a shooting unit appear in the market, but a modularity issue of these units needs to be addressed.

SUMMARY

According to an aspect of the embodiments of the present disclosure, an autonomous cleaning device is provided. The autonomous cleaning device includes: a device body, a drive module, a cleaning module and a sensing module, in which the drive module, the cleaning module and the sensing module are detachably assembled to the device body, respectively.

It is to be understood that both the foregoing general description and the following detailed description are exemplary and explanatory only, and cannot be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in detail with reference to specific embodiments shown in the accompanying drawings. However, these embodiments cannot be construed to limit the present disclosure, and changes in terms of structure, method or function, made by those skilled in the art, are contained in the protection scope of the present disclosure.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

Figure 1:
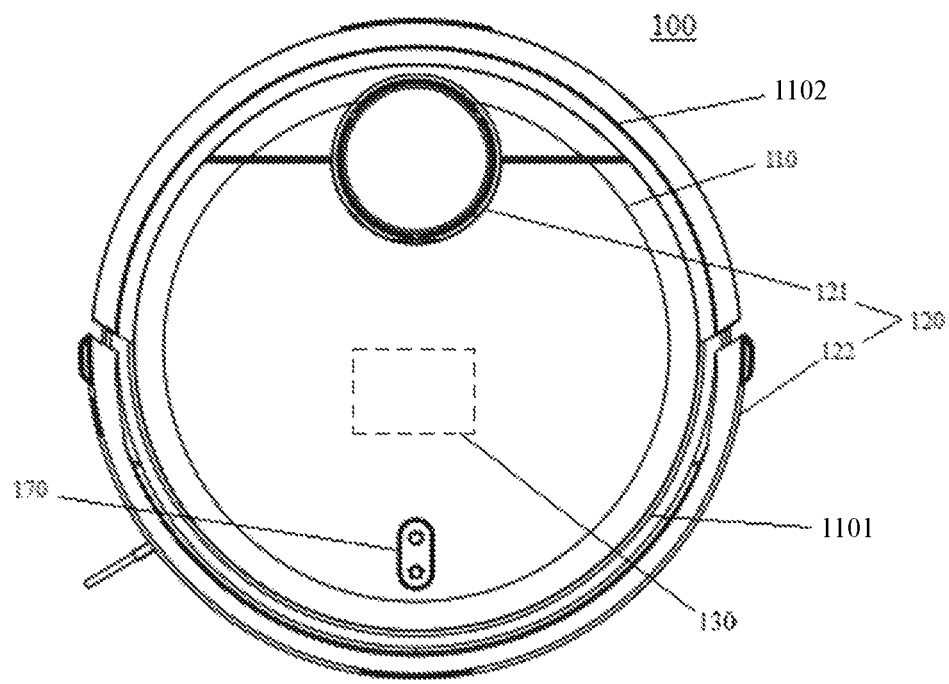
FIGS. 1-4 are schematic views of an autonomous cleaning device according to an illustrative embodiment.
Figure 2:
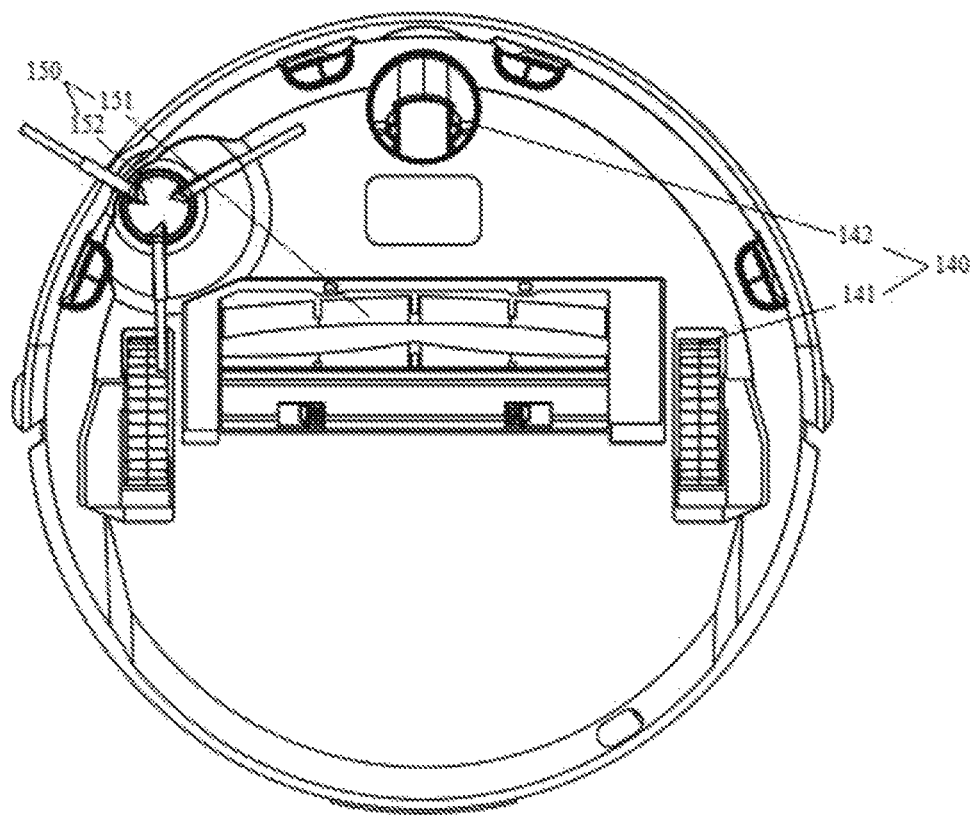
Figure 3:
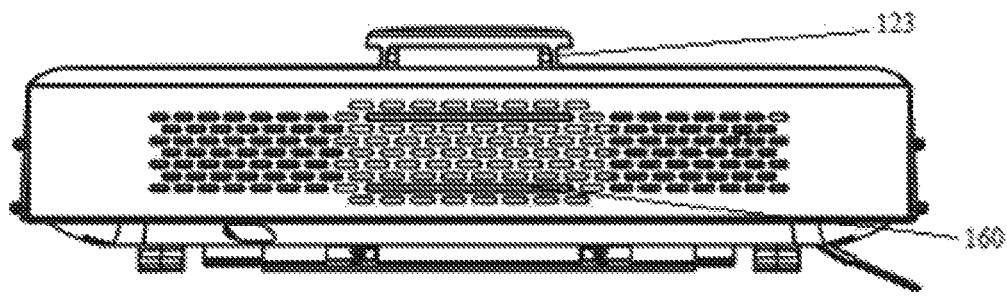
Figure 4:
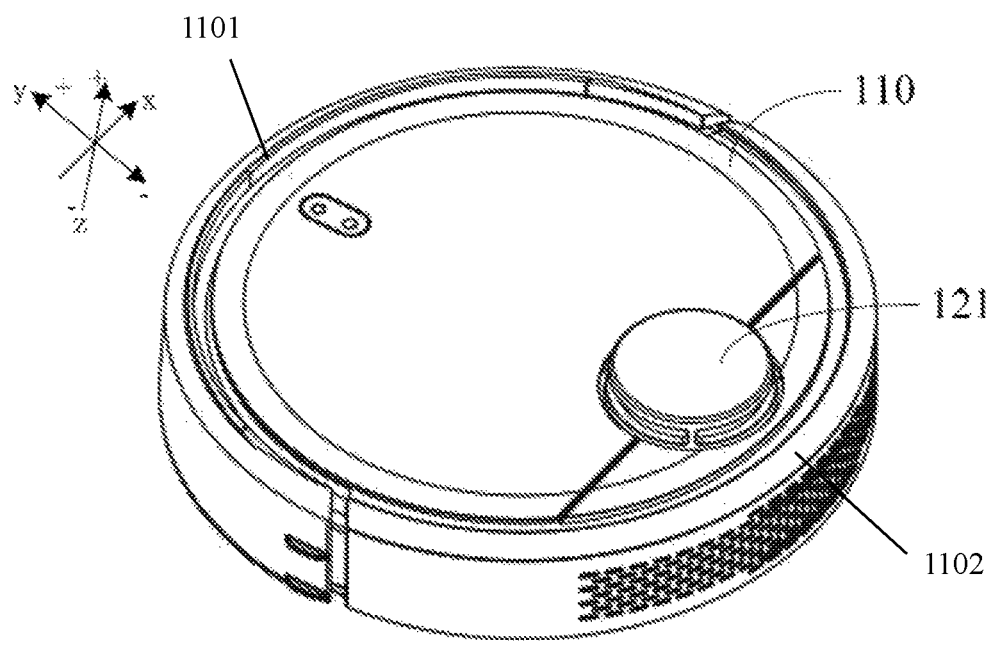
Figure 5:
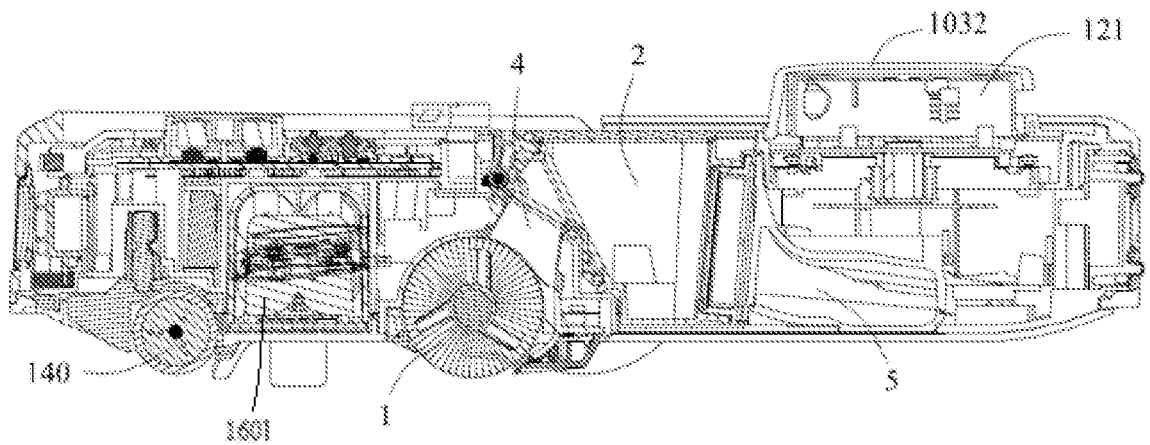
FIG. 5 is a sectional view of an autonomous cleaning device according to an illustrative embodiment.

As shown in FIGS. 1 to 5, FIGS. 1-4 are schematic views of an autonomous cleaning device according to an illustrative embodiment, and FIG. 5 is a sectional view of an autonomous cleaning device according to an illustrative embodiment.

The autonomous cleaning device 100 may be an autonomous sweeping device, an autonomous mopping device and so on. The autonomous cleaning device 100 may include a device body 110, a sensing system 120, a control system 130, a drive module 140, a cleaning system 150, an energy system 160, and a human-device interaction system 170.

The device body 110 includes a forward portion 1101 and a rearward portion 1102 in an advancing direction thereof, and has an approximately round shape (both front and rear ends being round). The device body 110 may have other shapes, for example including but not limited to an approximate D shape which has a square front end and a round rear end.

The sensing system 120 includes a sensing module 121 located above the device body 110, a buffer 122 located at the forward portion 1101 of the device body 110, a cliff sensor 123, an ultrasonic sensor (not shown), an infrared sensor (not shown), a magnetometer (not shown), an accelerometer (not shown), a gyroscope (not shown), an odometer (not shown) and other sensing components, so as to provide the control system 130 with various position information and motion state information of the device. The sensing module 121 of the present disclosure includes a camera and a laser distance sensor (LDS), but is not limited thereto. The laser distance sensor using triangulation ranging is taken as an example for describing how to determine a position. The basic principle of triangulation ranging is based on a geometric relationship of similar triangles, which will not be described in detail.

The laser distance sensor includes a light emitting unit (not shown) and a light receiving unit (not shown). The light emitting unit may include a light source for emitting light, and the light source may include a light emitting element, such as an infrared light emitting diode (LED) for emitting infrared light or a visible light emitting diode (LED) for emitting visible light. In some embodiments, the light source may be a light emitting element capable of emitting a laser beam. This embodiment describes an example where a laser diode (LD) is used as the light source. Specifically, the light source using the laser beam may make measurement more accurate than other light sources, due to monochromatic, directional and collimating properties of the laser beam. For example, compared with the laser beam, the infrared light or the visible light emitted by the LED is affected by the surrounding environment (e.g. a color or texture of an object), thereby degrading measurement accuracy. The LD may emit a point laser to measure two-dimensional position information of an obstacle, or a line laser to measure three-dimensional position information within a certain range of the obstacle.

The light receiving unit may include an image sensor, on which a light spot reflected or scattered by the obstacle is formed. The image sensor may be a set of unit pixels in a single row or multiple rows. These light receiving elements may convert an optical signal into an electrical signal. The image sensor may be a complementary metal oxide semiconductor (CMOS) sensor or a charge-coupled device (CCD) sensor. Moreover, the light receiving unit may include a light receiving lens assembly. The light reflected or scattered by the obstacle may travel through the light receiving lens assembly to form an image on the image sensor. The light receiving lens assembly may include a single lens or a plurality of lenses.

A base (not shown) may be configured to support the light emitting unit and the light receiving unit that are arranged on the base and spaced apart from each other by a particular distance. In order to measure obstacles in all directions (i.e. 360 degrees) of the autonomous cleaning device, the base may be rotatably arranged to the device body 110, or the base itself does not rotate, and instead the light emitting unit and the light receiving unit are rotated by providing a rotating element. A rotational angular velocity of the rotating element may be obtained by providing an optical coupler and a coded disk. The optical coupler senses tooth absences of the coded disk, and an instantaneous angular velocity is obtained through dividing a distance between the tooth absences by a time period of sliding across the distance between the tooth absences. The larger the density of the tooth absences of the coded disk is, the higher the accuracy and precision of the measurement is, but the structure is more precise and the calculation amount also becomes greater. Conversely, the smaller the density of the tooth absences is, the lower the accuracy and precision of the measurement is, but the structure is relatively simple and the calculation amount becomes less, thus reducing the cost to some extent.

A data processing means (not shown) connected with the light receiving unit, for example a digital signal processor (DSP), records distance values of obstacles at all angles in a zero-angle direction relative to the autonomous cleaning device, and sends the values to a data processing unit of the control system 130, such as an application processor (AP) having a CPU. The CPU runs a positioning algorithm based on a particle filter to obtain a current position of the autonomous cleaning device, and hence a map is drawn based on the position and further used for navigation. In some embodiments, the positioning algorithm employs simultaneous localization and mapping (SLAM).

The laser distance sensor based on the triangulation ranging may measure a distance value at an infinitely distant place beyond a certain distance in principle, but it is actually difficult to implement the long distance measurement, for example, over six meters, mainly due to a size limit of the pixel unit on the sensor of the light receiving unit, and also due to influences of a photoelectric conversion speed of the sensor, a data transmission speed between the sensor and the DSP connected thereto, and a calculation speed of the DSP. The measurement value obtained by the laser distance sensor in the presence of a temperature influence will encounter a change unbearable by the system, mainly because thermal expansion of a structure between the light emitting unit and the light receiving unit causes an angle change between the incident light and the emergent light, and the light emitting unit and the light receiving unit themselves have a temperature drift. The accumulation of deformations caused by temperature changes, vibration and other factors will affect the measurement result severely after a long-term use of the laser distance sensor. The accuracy of the measurement result directly determines the accuracy of mapping, which is the basis for further strategy implementation of the autonomous cleaning device and hence is particularly important.

The forward portion 1101 of the device body 110 may carry the buffer 122. When a drive wheel module 141 pushes the autonomous cleaning device to walk on the ground in a cleaning process, the buffer 122 detects one or more events (or objects) in a travel path of the autonomous cleaning device 100, via the sensing system, for example the infrared sensor. The autonomous cleaning device 100 may control the drive wheel module 141 so as to respond to the events (or objects), for example, keeping away from the obstacles, based on the events (or objects) detected by the buffer 122, such as the obstacles, walls, etc.

The control system 130 is provided on a circuit mainboard inside the device body 110, and includes a computing processor communicated with a non-transitory memory (e.g. a hard disk, a flash memory or a RAM), such as a central processing unit and an application processor, in which the application processor utilizes a positioning algorithm, for example SLAM, to draw a real-time map of the environment where the autonomous cleaning device is, based on the obstacle information fed back by the LDS. Moreover, the control system 130 comprehensively determines a current working state of the autonomous cleaning device in combination with distance information and speed information fed back by the buffer 122, the cliff sensor 123, the ultrasonic sensor, the infrared sensor, the magnetometer, the accelerometer, the gyroscope, the odometer and the like. For instance, the autonomous cleaning device is going across a doorsill, going onto a carpet, or located at the cliff; or an upper portion or a lower portion of the autonomous cleaning device is stuck; or a dust box thereof is full; or the autonomous cleaning device is lifted. The control system 130 may further give the next specific action strategy in the light of above different situations, to make the working of the autonomous cleaning device more in line with the requirements of the owner and thus ensure a better user experience. Further, the control system 130 may plan the most efficient and reasonable sweeping path and sweeping mode based on information of the real-time map drawn through SLAM, thus improving a sweeping efficiency of the autonomous cleaning device greatly.

The drive module 140 may manipulate the autonomous cleaning device 100 to travel across the ground based on a drive instruction having distance and angle information, for example x, y and θ components. The drive module 140 includes the drive wheel module 141, and the drive wheel module 141 may control a left wheel and a right wheel simultaneously. In some embodiments, the drive wheel module 141 includes a left drive wheel unit 1411 and a right drive wheel unit 1412 for more precise control over the motion of the autonomous cleaning device. The left drive wheel unit 1411 and the right drive wheel unit 1412 are opposed to each other along a transverse axis defined by the device body 110. To enable the autonomous cleaning device to move on the ground more stably or have a stronger moving ability, the autonomous cleaning device may include one or more driven wheels 142 which include but are not limited to universal wheels. The drive wheel module 141 includes a travel wheel, a drive motor, and a control circuit for controlling the drive motor, and may be connected with a circuit for measuring a drive current and an odometer. The drive wheel module 141 may be detachably connected to the device body 110, thus facilitating assembling, disassembling and maintenance thereof. The drive wheel module 141 may have an offset drop-type suspension system, and may be fastened in a movable manner, for example, attached to the device body 110 in a rotatable manner, and receive a spring offset biased downwards and away from the device body 110. The spring offset allows the drive wheel to maintain contact and traction with the ground by a certain ground adhesive force, and meanwhile, a cleaning element of the autonomous cleaning device 100 also touches the ground with a certain pressure.

The cleaning system 150 may be configured as a dry cleaning system and/or a wet cleaning system. As the dry cleaning system, the main cleaning function comes from a sweeping system 150 including a main brush structure, a dust box structure, a fan structure, an air outlet, and connecting members among the four parts. The main brush structure that has certain interference with the ground sweeps up rubbish on the ground and carries it to a dust suction port between the main brush structure and the dust box structure, and then the rubbish is sucked into the dust box structure by a suction gas generated by the fan structure and passing through the dust box structure. A dedusting capability of the autonomous cleaning device may be represented by a dust pick up (DPU) efficiency, and the DPU efficiency is influenced by a structure and materials of a main brush, by a wind power utilization rate of air channels constituted by the dust suction port, the dust box structure, the fan structure, the air outlet and the connecting members among the four parts, and by a type and a power of a fan, and thus the DPU efficiency is a complex system design issue. Compared with an ordinary plug-in cleaner, enhancement of the dedusting capability is more significant for a cleaning robot with limited energy. Because the enhancement of the dedusting capability lowers an energy requirement effectively, i.e., the autonomous cleaning device, which originally sweeps 80 square meters of ground on one charge, may sweep 100 square meters of ground or even more on one charge now. Moreover, a service life of a battery will be extended greatly due to the reduced number of charge cycles, such that the frequency of replacing the battery by a user will be decreased. More intuitively and importantly, the enhancement of the dedusting capability brings the prominent and significant user experience, and the user may directly draw a conclusion whether the autonomous cleaning device sweeps or wipes cleanly. The dry cleaning system may further include a side brush 152 having a rotating shaft, and the rotating shaft has a certain angle relative to the ground, so as to move debris into a main brush region of the cleaning system 150.

The energy system 160 includes a rechargeable battery, such as a Ni-MH battery or a lithium battery. The rechargeable battery may be connected with a charge control circuit, a circuit for detecting a charging temperature of a battery pack, and a circuit for monitoring battery under-voltage, and then these three circuits are connected to a single-chip control circuit. A main machine is charged by connecting a charging electrode with a charging post, in which the charging electrode is provided at a side of the main machine or below the main machine. If the exposed charging electrode is adhered with dust, an accumulative effect of charge will cause melting and deformation of a plastic body around the electrode in a charging process, and even lead to deformation of the electrode per se, thus failing to continue normal charging.

The human-device interaction system 170 includes keys provided on a panel of the main machine and configured for function selection by the user. The human-device interaction system 170 may further include a display screen and/or an indicator light and/or a speaker that are configured to show the user the current state of the autonomous cleaning device or function options. Moreover, the human-device interaction system 170 may further include a mobile client program. For a cleaning device of a path-navigation type, a mobile client may show the user a map of an environment where the device is located, and a location of the autonomous cleaning device, so as to provide the user with richer and user-friendlier function options.

To describe behaviors of the robot (i.e., the autonomous cleaning device) more clearly, directions are defined as follows. The autonomous cleaning device 100 may travel on the ground through various combinations of movements relative to three mutually perpendicular axes, namely, a transverse axis x, a front-rear axis y and a central vertical axis z, which are defined by the device body 110. A forward driving direction along the front-rear axis y is denoted as "forward", and a rearward driving direction along the front-rear axis y is denoted as "rearward". The transverse axis x substantially extends between the right wheel and the left wheel of the robot while passing through an axis center defined by a central point of the drive wheel module 141, in which the autonomous cleaning device 100 may rotate around the axis x. When the forward portion of the autonomous cleaning device 100 inclines upwards and the rear portion thereof inclines downwards, the autonomous cleaning device "pitches up"; when the forward portion of the autonomous cleaning device 100 inclines downwards and the rear portion thereof inclines upwards, the autonomous cleaning device "pitches down". Moreover, the autonomous cleaning device 100 may rotate around the axis z. In a forward direction of the robot, when the autonomous cleaning device 100 inclines towards a right side of the axis y, the autonomous cleaning device "turns right"; when the autonomous cleaning device 100 inclines towards a left side of the axis y, the autonomous cleaning device 100 "turns left".

In the present disclosure, the sensing module serves as eyes of the autonomous cleaning device 100, is a sensing element of such autonomous cleaning device 100, and thus requires high precision of installation. In an existing autonomous cleaning device, the sensing module (e.g. LDS) is integrated onto the control mainboard within the device body, or is fixed to a chassis and further connected to the control mainboard by a flexible cable, but these solutions are faced with the following issues.

(1) A dimensional chain in above solutions is long and may easily result in a bigger error of the LDS measurement data. If the LDS is installed to the mainboard or the chassis, an outer frame of the LDS further needs to be fitted with an upper housing for fixing various components, and even with a decorative upper cover, in addition to being fitted with the control mainboard or the chassis, which thus makes the dimensional chain longer and causes a bigger error of being fitted with the outer frame of the LDS. The upper and lower housings and other parts have a big machining deformation due to their large sizes, which may make an installation position of the LDS inaccurate, i.e. the position of the LDS relative to a center of the whole device is not accurate, such that distance data fed back to the processor cannot go through coordinate conversion accurately, and hence the distance data of the robot has a great error. The LDS has a high requirement in precision and is susceptible to temperature, stress, vibration and other factors, and the temperature drift may appear over time, so an influence of the error, introduced in the assembling process, on the measurement data cannot be ignored.

(2) The LDS is difficult to be assembled or disassembled for replacement and maintenance. Once the sensing module is damaged, the whole device needs to be disassembled for maintenance or replacement of components. The user has to send the whole device back to a processor or a designated repair point for maintenance, which not only causes maintenance difficulties for maintenance personnel, but also leads to a long maintenance cycle, thus bringing much inconvenience to the user.

Thus, the present disclosure proposes a modular scheme of the sensing module, a main brush assembly, a dust box assembly and the drive module. Descriptions will be made with reference to FIGS. 5 to 11 in the following.

Figure 6:
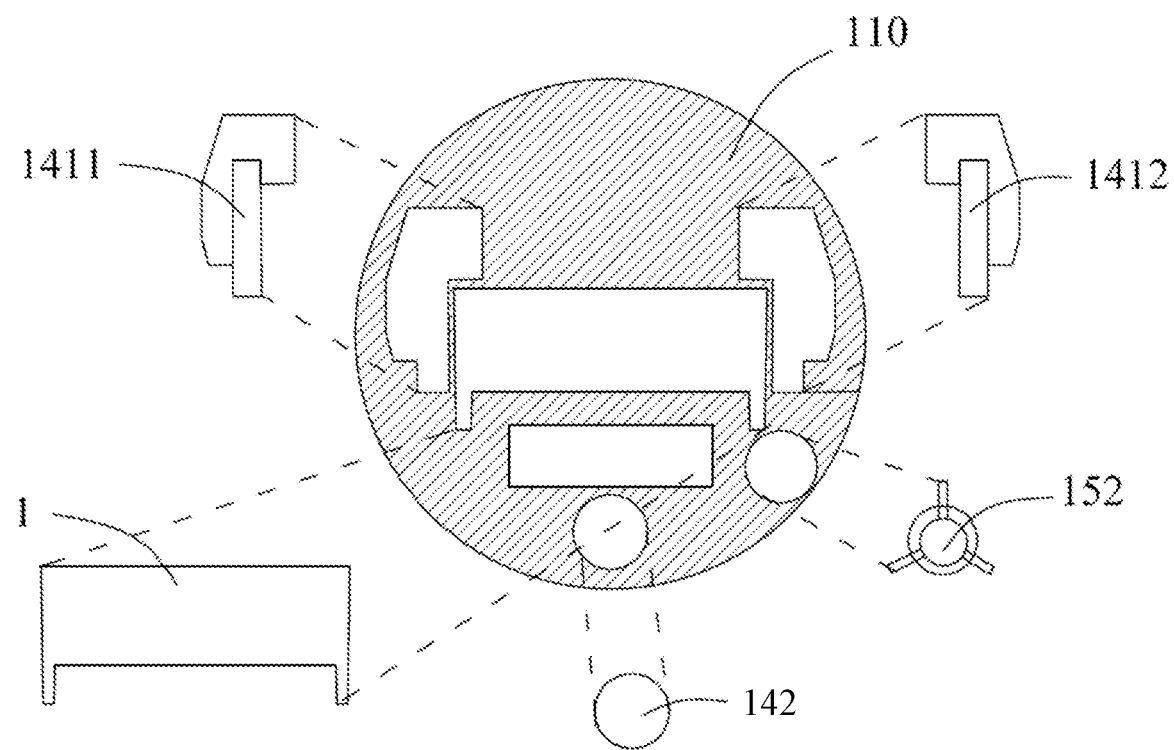
FIG. 6 is a planar exploded view of module structures of an autonomous cleaning device according to an illustrative embodiment.
Figure 7:
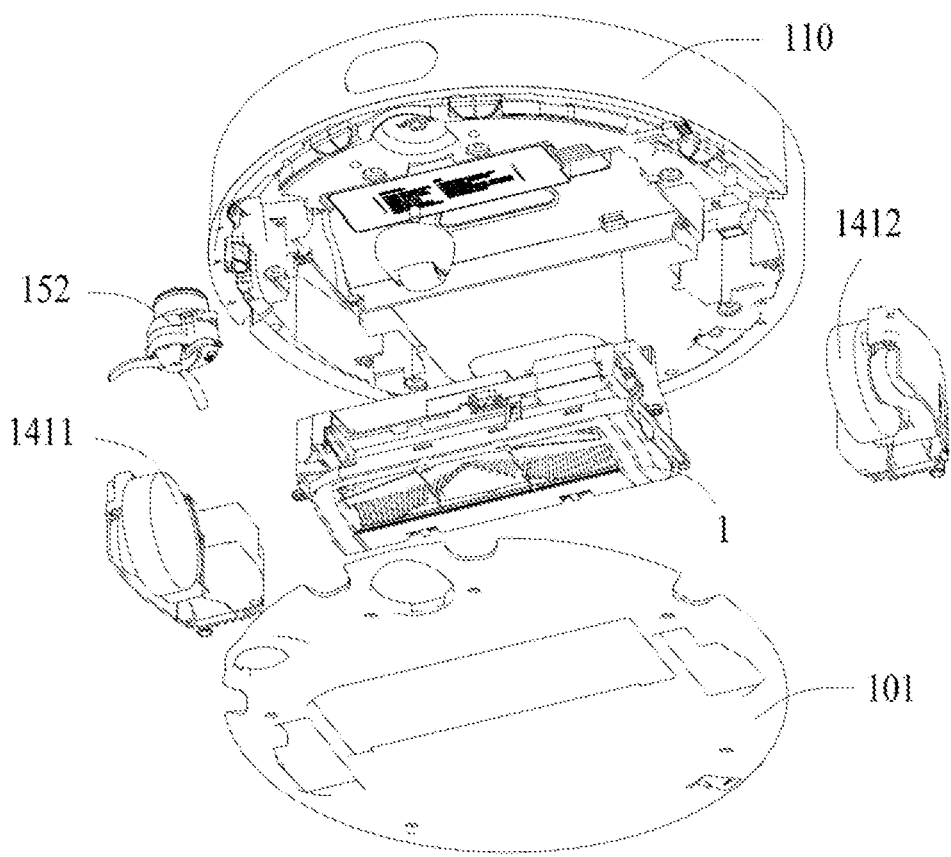
FIG. 7 is a perspective exploded view of module structures of an autonomous cleaning device according to an illustrative embodiment.
Figure 8:
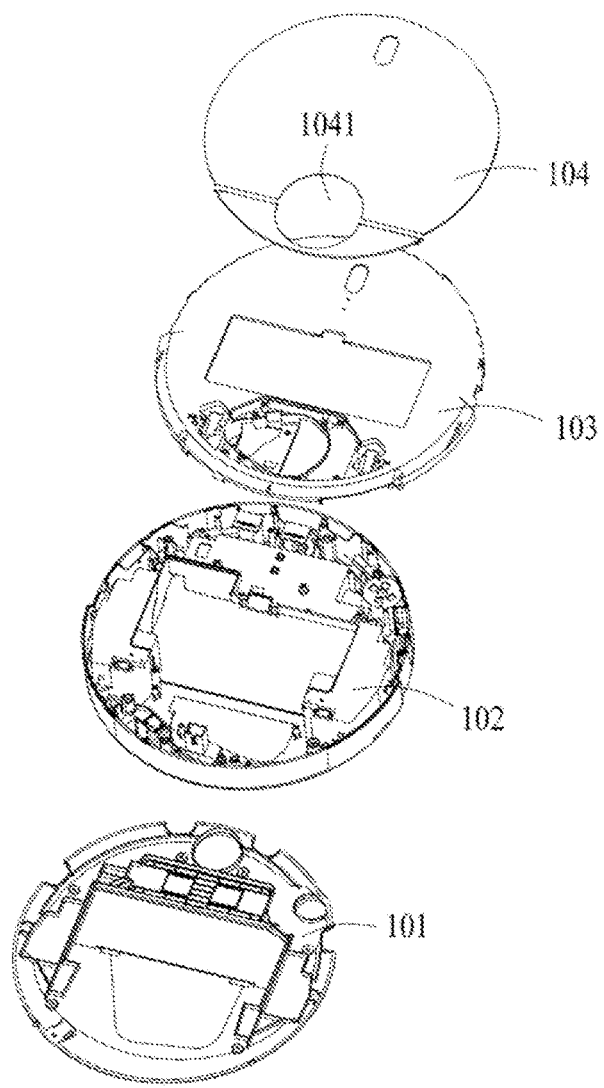
FIG. 8 is an exploded view of a device body of an autonomous cleaning device according to an illustrative embodiment.

As shown in FIGS. 6 to 8, FIG. 6 is a planar exploded view of a chassis of an autonomous cleaning device according to an illustrative embodiment; FIG. 7 is a perspective exploded view of module structures of an autonomous cleaning device according to an illustrative embodiment; FIG. 8 is an exploded view of a device body of an autonomous cleaning device according to an illustrative embodiment.

As shown in FIGS. 1 to 6, the autonomous cleaning device 100 includes: the device body 110, the sensing module 121, the drive module 140, a cleaning module 150 and a battery module 1601. In the present disclosure, the drive module 140, the cleaning module and the sensing module 121 may be assembled to the device body 110 in a detachable manner respectively, such that each module may be separately assembled to or detached from the device body 110.

As shown in FIGS. 7 and 8, the device body 110 includes the chassis 102, a bottom housing 101 fixed below the chassis 102, an upper housing 103 fixed above the chassis 102, and an upper cover 104 fixed above the upper housing 103. The bottom housing 101 is located under the chassis 102, such that on one hand water and dust on the ground may be prevented from entering an accommodating space of the chassis 102 and polluting interfaces of various modules, i.e. waterproof and dustproof, on the other hand various modules and the chassis 102 may be protected from being damaged by foreign impact, and finally a decorative role may be played. The chassis 102 serves as a primary carrier on which various modules are carried, so it has high requirements on various aspects of material properties, such as hardness and toughness, and machining precision. Besides the accommodating space for accommodating various modules, the chassis 102 also includes interfaces for electrical connection and mechanical connection provided in the accommodating space. The interface for electrical connection is provided at a corner of the accommodating space close to an inner side of the device body, where the interface is not susceptible to interference. The interface for mechanical connection is provided at a corner of the accommodating space close to an outer side of the device body, for example screws arranged in a triangular form, so as to ensure strong structural stability. The upper housing 103 is located above the chassis 102, such that an accommodating space is provided for carrying the LDS, in which the accommodating space satisfies a requirement of positioning the LDS accurately, protects the LDS from damages by external forces, and enables the LDS to be detached with no need to disassemble the whole device, but only to open the upper cover 104 and the upper housing 103. Furthermore, the upper housing 103 may also serve as a protection against water, dust and external forces. The upper housing 103 may be perforated to allow the dust box, the indicator light and an interaction panel to pass, and provide an accommodating space for the cliff sensor. The upper cover 104 mainly plays a decorative role and makes little contribution to the structural hardness. The protective upper cover 104 of the LDS protects the LDS from damages by external forces and allows emitted light and reflected light of the laser beam to pass.

The sensing module 121 is configured as a LDS module. The drive module includes the drive wheel module and at least one driven wheel, and the drive wheel module further includes the left and right drive wheel units (1411, 1412). The present disclosure includes one driven wheel 142 for cooperating with the left and right drive wheel units (1411, 1412) to drive the device body 110 to move. The cleaning module includes a floating main brush assembly 1 and a side brush 152. The sensing module 121 is assembled upwards to the upper housing 103, the drive module, the cleaning module and the battery module 1601 are assembled downwards to the chassis 102, and the dust box assembly is assembled upwards to the chassis 102. The upper housing 103 and the chassis 102 both reserve spaces used for corresponding modules and matched with the modules in shape, and side walls of the spaces are sufficiently rigid and perpendicular to the upper housing 103 and the chassis 102, thus providing secure and solid spaces for various modules and protecting the modules from being squeezed by external forces in an extreme environment. The accommodating space is further provided with interfaces for electrical connection, e.g. connecting fingers, to allow various modules to be electrically connected with the circuit mainboard, so as to receive control signals and feed back measurement values. The accommodating space is further provided with components for mechanical connection, such as screws and bayonets, to allow interference fit and tight connection between the modules and the upper housing.

Figure 9:
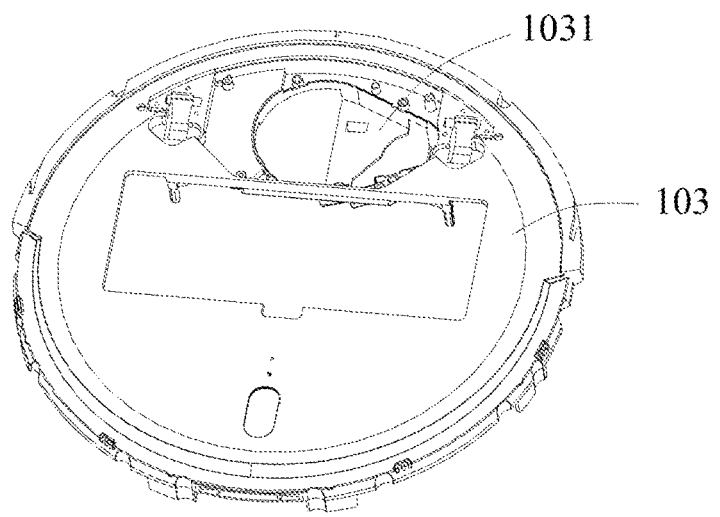
FIG. 9 is a schematic view of an upper housing of an autonomous cleaning device according to an illustrative embodiment.
Figure 10:
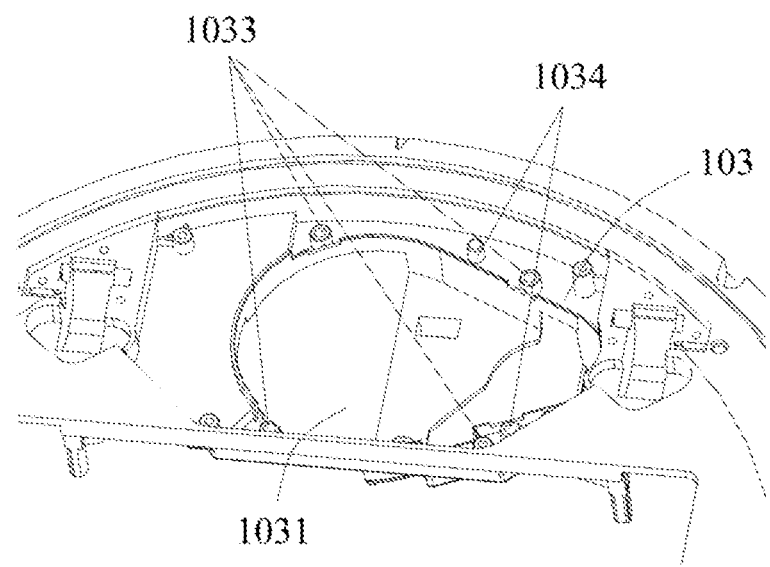
FIG. 10 is a schematic view of a part of an upper housing for assembling a sensing module according to an illustrative embodiment.
Figure 11:
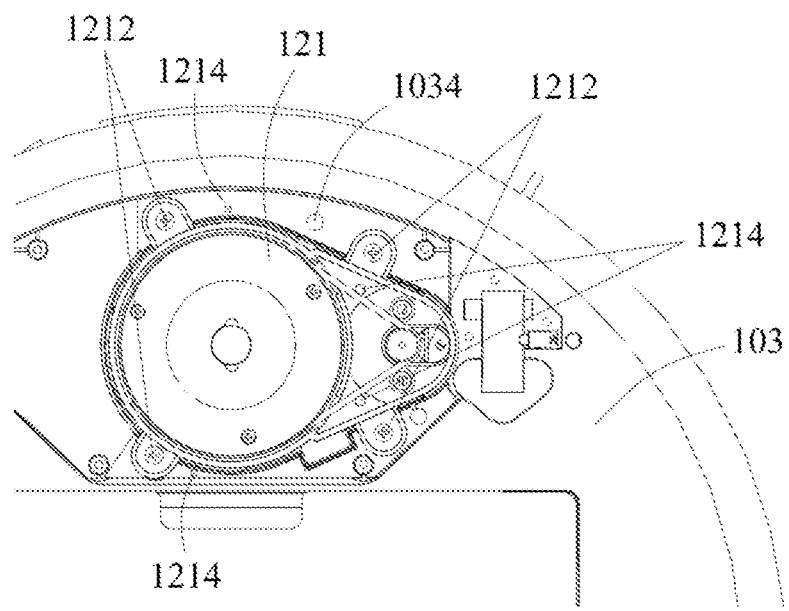
FIG. 11 is a schematic view of an upper housing assembled with a sensing module according to an illustrative embodiment.
Figure 12:
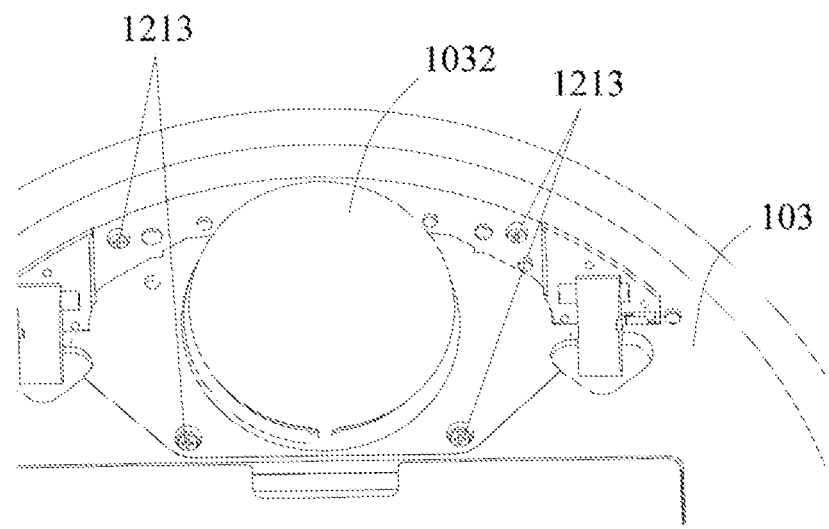
FIG. 12 is a schematic view of an upper housing assembled with a protection cover according to an illustrative embodiment.
Figure 13:
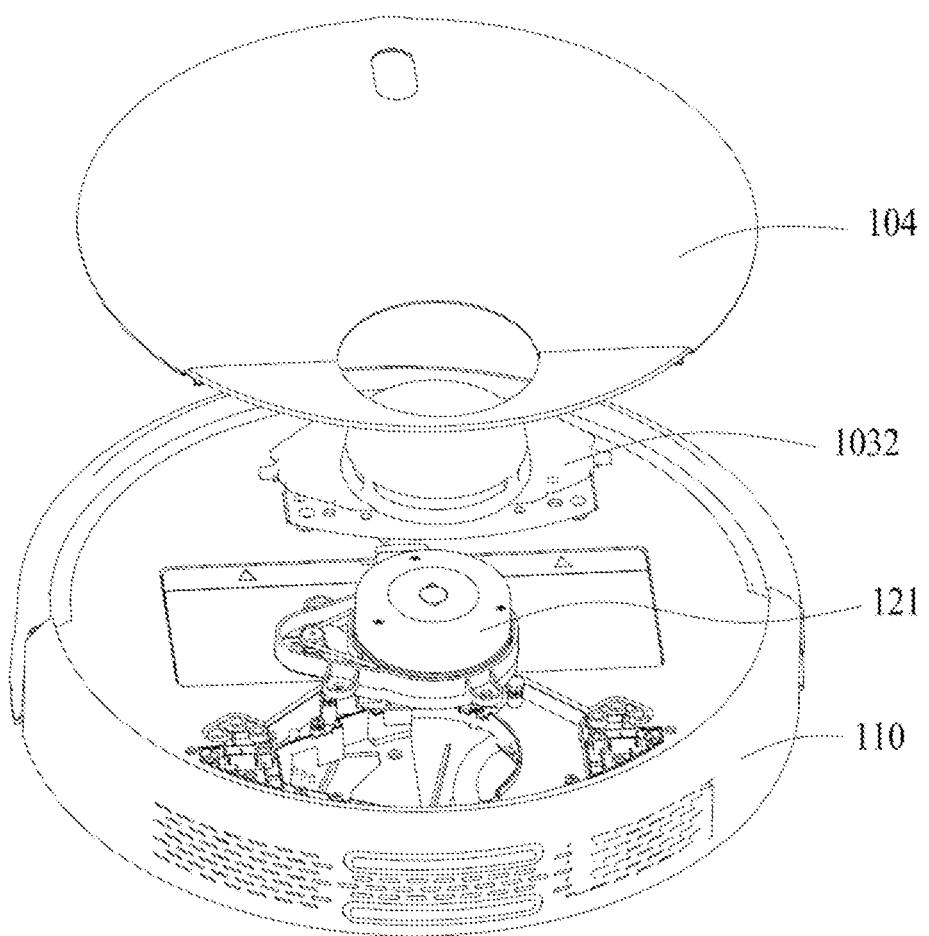
FIG. 13 is an exploded schematic view showing a sensing module according to an illustrative embodiment.

As shown in FIG. 9, FIG. 9 is a schematic view of an upper housing of an autonomous cleaning device according to an illustrative embodiment. The sensing module 121 is assembled to a predetermined position in the upper housing 103, and the predetermined position refers to an accommodating chamber 1031 fitted with the sensing module 121, i.e. the upper housing 103 reserves an accommodating space for allowing the sensing module 121 to be assembled thereto. The predetermined position not only satisfies the requirement of positioning the sensing module 121 accurately, but also protects the sensing module 121 from damages by external forces. The predetermined position is located at the rearward portion of the device body 110, so the sensing module 121 is located at the rearward portion of the device body 110.

Further, as shown in FIGS. 9 to 13, in order to protect the sensing module 121, the device body 110 further includes a protection cover 1032, and the sensing module 121 is located between the accommodating chamber 1031 and the protection cover 1032. Specifically, after the sensing module 121 is assembled into the accommodating chamber 1031, the protection cover 1032 is further fixed to the upper housing 103 to cover the sensing module 121. The sensing module 121 is fixed to the upper housing 103 by a first connecting piece, and the protection cover 1032 is fixed to the upper housing 103 by a second connecting piece, thus facilitating removal of the sensing module 121 from the device body 110 and realizing a purpose of modularity. Optionally, the first connecting piece and the second connecting piece may be selected as screws, and certainly other connecting pieces are contained in the present disclosure as long as they facilitate assembling and disassembling.

In an optional embodiment, the protection cover 1032 is made of combinational materials of high-strength nylon and glass fiber, such that the protection cover 1032 has strong hardness to withstand external forces from all directions, thereby providing better protection for the sensing module 121. In the present disclosure, a circumferential side of the protection cover 1032 is hollowed out so as not to affect detection of surrounding obstacles by the sensing module 121. The circumferential side of the protection cover 1032 includes at least one column, which should meet a strength requirement and not be too wide to block emission and reception of the laser beam. In some embodiments, three columns are provided, and a width of each column is reduced as much as possible on the premise of selecting high-strength materials. Since the protection cover 1032 of the LDS and the upper housing 103 are separate, the protection cover 1032 may be separately designed with the high-strength materials, so as to reduce the width of the column. Typically, the sensing assembly is provided on the chassis, the protection cover and the upper housing are integrated, and an overall design with the high-strength materials will cause a substantial increase in cost, so the width of the column is relatively large, thus blocking emission and reception of the laser beam for ranging.

After the protection cover 1032 is assembled, the upper cover 104 is assembled to the upper housing 103. The upper cover 104 is provided with a clearance hole 1041 at a position corresponding to the sensing module 121, the sensing module 121 partially protrudes out of the upper cover 104 through the clearance hole 1041, and a part of the protection cover 1032 also protrudes out of the upper cover 104 because the protection cover 1032 covers the sensing module 121. Further, the upper cover 104 includes a main cover body connected pivotably. In embodiments of the present disclosure, the sensing module 121 is arranged adjacent to the dust box assembly.

In a process of assembling the sensing module 121, it is unnecessary to disassemble the upper housing 103 and the bottom housing 101, only the upper cover 104 needs to be opened, and then, the sensing module 121 is fixed to the upper housing 103 by screws 1212, in which a plurality of connection holes 1033 corresponding to the upper housing 103 are provided at a periphery of the sensing module 121. Alternatively, the sensing module 121 is fixed to the upper cover 104 by four screws 1212 in the present disclosure. After the sensing module 121 is fixed, the protection cover 1032 is fixed to the upper housing 103 by a plurality of screws 1213, and covers the sensing module 121. Further, the upper housing 103 further includes a plurality of support columns 1034, and the plurality of support columns 1034 are correspondingly located at a periphery of the protection cover 1032 to support the protection cover 1032, such that a certain safety gap exists between the protection cover 1032 and the sensing module 121, thus preventing the protection cover 1032 from directly transmitting an external force to the sensing module 121 when the external force is exerted on the protection cover 1032.

In a process of detaching the sensing module 121, it is unnecessary to disassemble the upper housing 103 and the chassis 102 beforehand, and the sensing module 121 may be directly detached after the upper cover 104 is opened. Specifically, the protection cover 1032 is detached in advance by unscrewing the screws 1213 with a screwdriver, and then the screws 1212 are removed from the sensing module 121, such that the sensing module 121 may be detached or replaced directly.

In the present disclosure, the accommodating chamber 1031 for the LDS and the LDS itself both have a water drain hole, and if water enters this space, the water will flow out from the drain hole without causing failure of the LDS.

Specifically, a waterproof and dustproof hole 1214 is provided at the periphery of the sensing module 121, and a through hole (not shown) corresponding to the waterproof and dustproof hole 1214 is provided in the upper housing 103, such that the water flowing on the LDS flows downwards through the waterproof and dustproof hole 1214, and further flows out of the device body via the through hole in the upper housing 103. Further, the upper housing 103 may be provided with a through hole in a position below a motor of the LDS, and a guide groove may be provided under the through hole to prevent water droplets from flowing over to other positions at a lower surface.

Figure 14:
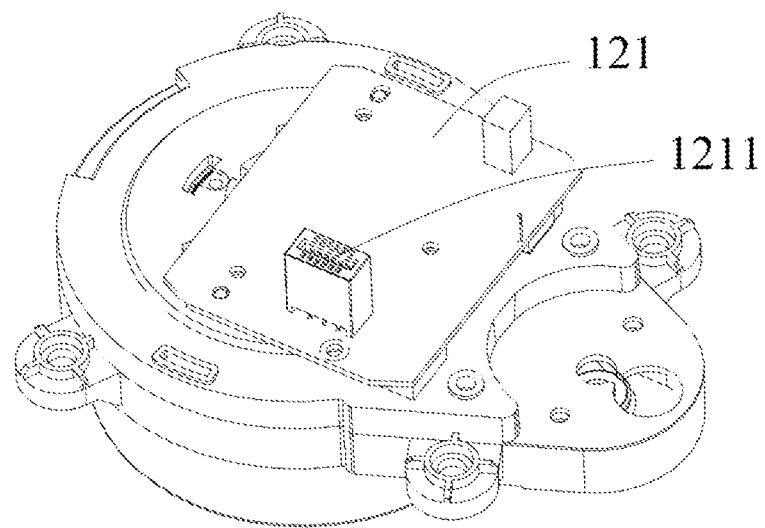
FIG. 14 is a bottom view of a sensing module according to an illustrative embodiment.

In the present disclosure, as shown in FIG. 14 which is a bottom view of a sensing module according to an illustrative embodiment, the sensing module 121 further includes a connector 1211 provided to a lower surface of the sensing module 121, so as to facilitate the detaching of the sensing module 121. The connector 1211 is electrically connected to a control component (i.e. the circuit mainboard) in the device body 110 in a hot-plug manner. The control component is located below the sensing module 121, and may be fixed to the chassis 102. The connector 1211 is configured as a vertical plug-in connector and has a certain tolerance capability, so as to make it convenient to detach the sensing module 121 and avoid a cable-organizing difficulty and a cable-crimping due to the use of cables.

Figure 15:
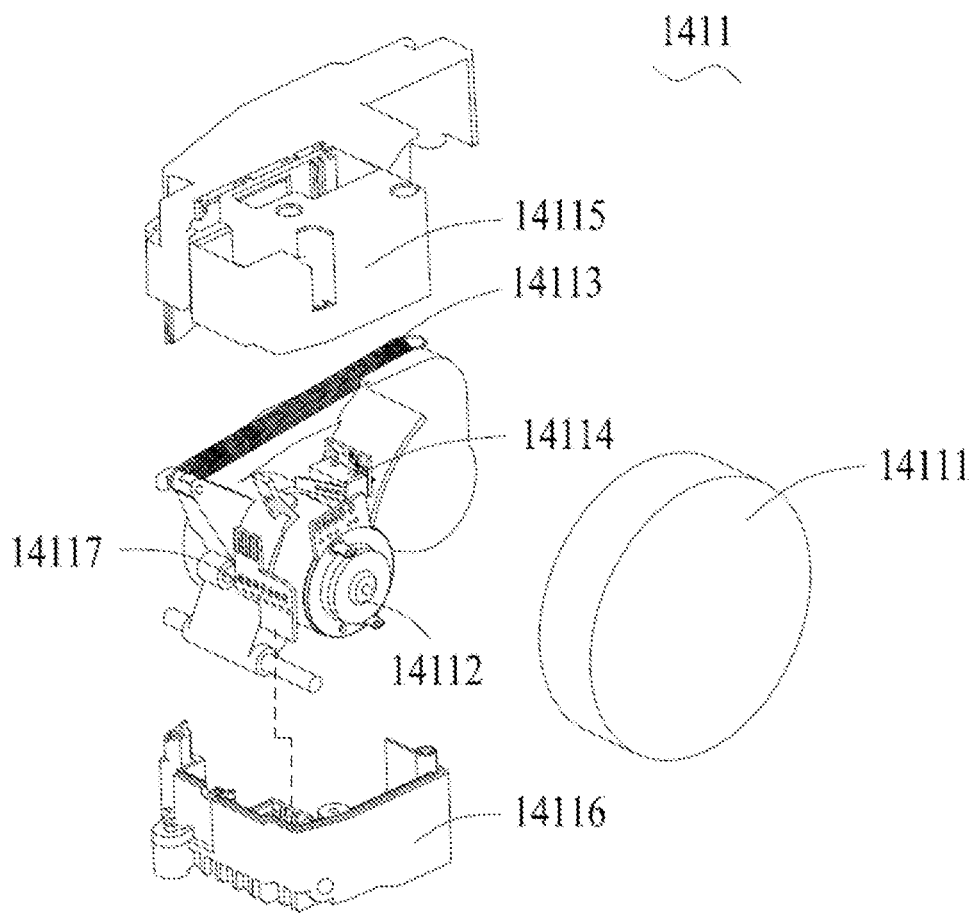
FIG. 15 is an exploded view of a left drive wheel unit according to an illustrative embodiment.

As shown in FIG. 15, the left drive wheel unit and the right drive wheel unit each include a wheel body 14111, a motor 14112, a spring 14113 and a Hall sensor 14114. When the main machine of the autonomous cleaning device is placed on the ground, most part of the wheel is retracted into the device body under gravity, and the spring 14113 is stretched. When the main machine is lifted from the ground, an elastic force of the spring 14113 pulls the wheel out of the device body, and the Hall sensor 14114 is triggered to inform the mainboard that the device is lifted. The left drive wheel unit has a substantially same functional structure as the right drive wheel unit, and part of shape structures of the left and right drive wheel units are adjusted due to different assembling locations of the left and right drive wheel units. The left drive wheel unit 1411 is taken as an example for description. The left drive wheel unit 1411 includes an upper casing 14115, a lower casing 14116 and a drive body fixed between the upper casing 14115 and the lower casing 14116. The drive body includes the wheel body 14111, the motor 14112, the spring 14113 and the Hall sensor 14114. A connector (not shown) of the left drive wheel unit 1411 is provided to the lower casing 14116, the drive body is electrically connected to the connector through a connecting finger 14117, and the connector is further connected to a corresponding position on the device body, so as to realize control over the left drive wheel unit 1411. The drive body is fixed between the upper casing 14115 and the lower casing 14116 by screws.

In the present disclosure, the cleaning module in an optimum configuration may be obtained by improving the corresponding cleaning system 150 of the above-described autonomous cleaning device 100, such that it is possible to reduce airflow loss in the cleaning module and improve a dust-collection efficiency under same power conditions. The present disclosure will be described below with reference to embodiments.

Figure 16:
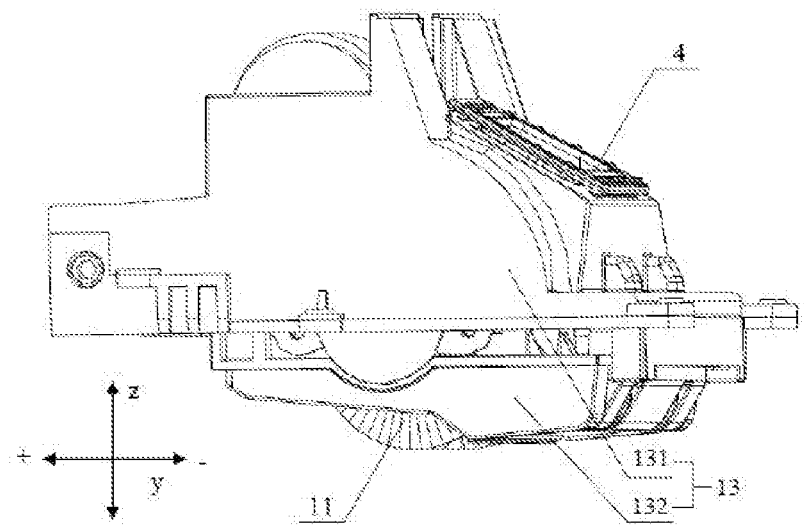
FIG. 16 is a perspective view of a main brush module in a main brush assembly according to an illustrative embodiment.
Figure 17:
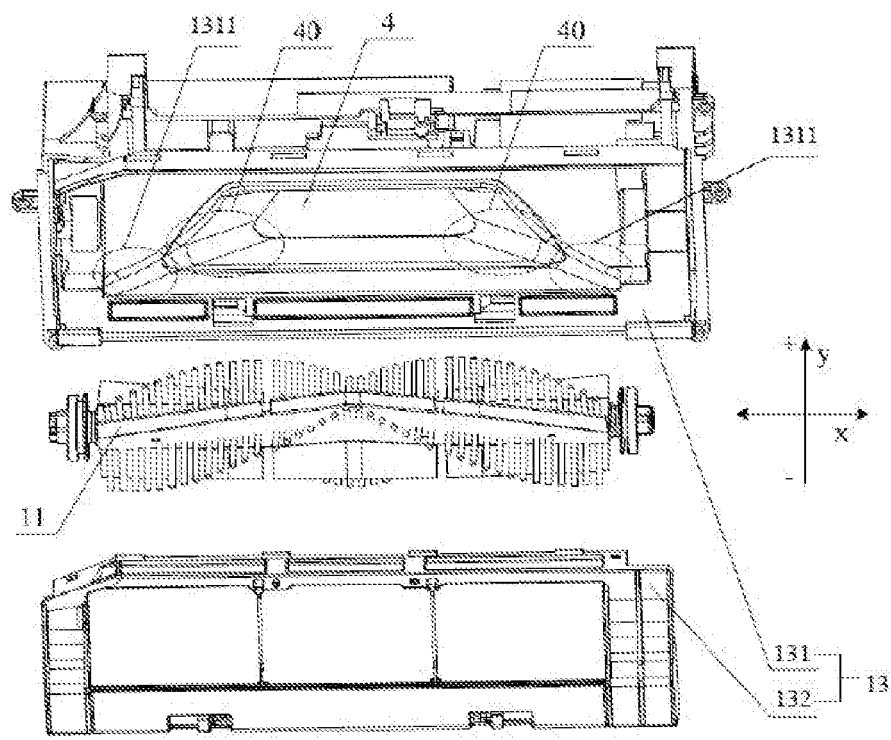
FIG. 17 is an exploded view of the main brush module shown in FIG. 16.

FIG. 16 is a sectional view of a cleaning module of an autonomous cleaning device according to an illustrative embodiment. When an autonomous cleaning device shown in FIG. 17 is the autonomous cleaning device 100 shown in FIGS. 1 to 4 or other similar devices, the cleaning module of the autonomous cleaning device 100 may correspond to the cleaning system 150 of the above-described autonomous cleaning device 100. For ease of description, FIG. 16 show direction information of the autonomous cleaning device in an illustrative embodiment, including the advancing direction along the axis y (in which a left direction of the axis y is assumed as a forward drive direction, denoted as "+", and a right direction of the axis y is assumed as a backward drive direction, denoted as "−") and a vertical direction along the axis z.

Figure 21:
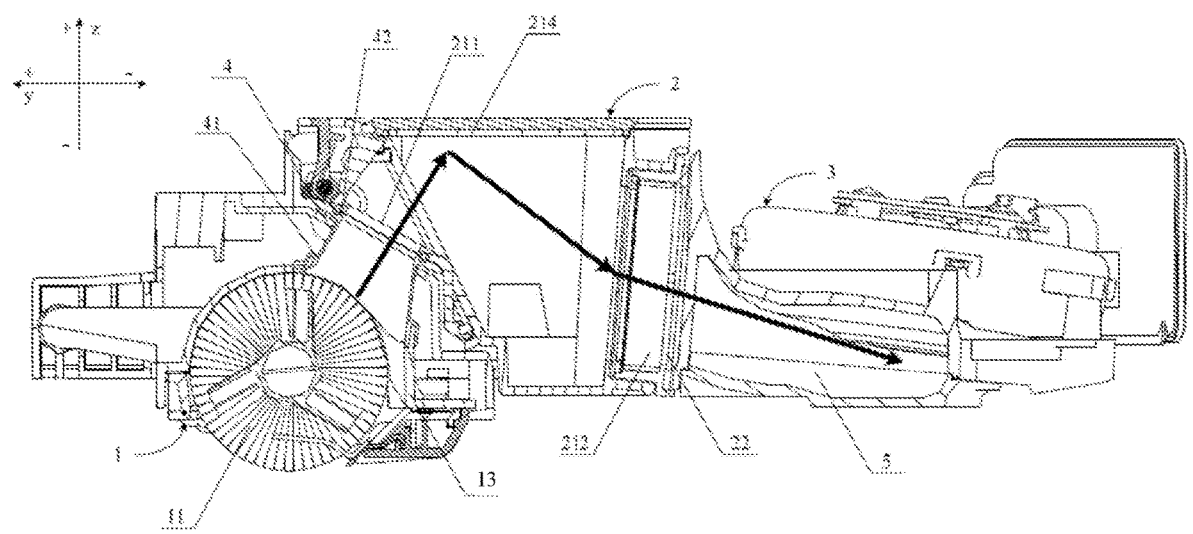
FIG. 21 is a sectional view of a cleaning module of an autonomous cleaning device according to an illustrative embodiment.

As shown in FIG. 16, the cleaning module is distributed within the device body, an air inlet of the cleaning module is provided in the bottom housing, and an air outlet of the cleaning module is provided in a side of the device body. The cleaning module of the present disclosure may include: the main brush assembly 1, the dust box assembly 2, a power unit 3, a primary air channel 4 and a secondary air channel 5, as shown in FIG. 21.

The main brush assembly 1, the dust box assembly 2 and the power unit 3 are arranged sequentially along the advancing direction (i.e. the axis y) of the autonomous cleaning device, and the primary air channel 4 is located between the main brush assembly 1 and the dust box assembly 2, while the secondary air channel 5 is located between the dust box assembly 2 and the power unit 3. Thus, the cleaning module shown in FIG. 16 may form an air path from the main brush assembly 1 to the drive unit 3 sequentially through the primary air channel 4, the dust box assembly 2 and the secondary air channel 5, such that wind generated by the power unit 3 may flow from the main brush assembly 1 to the drive unit 3 via the above air path, and a flow direction thereof is indicated by arrows shown in FIG. 21. When the wind generated by the power unit 3 is flowing among the main brush assembly 1, the primary air channel 4 and the dust box assembly 2, the objects to be cleaned, such as dust, granular rubbish, etc., which are swept by the main brush assembly 1, may be conveyed to the dust box assembly 2 to realize a cleaning operation.

The DPU efficiency is an accurate representation of a cleaning capability of the autonomous cleaning device, and determined by a suction efficiency and a main brush sweeping efficiency together. The discussion herein focuses on the suction efficiency. The suction efficiency is an accurate representation of a dust-collection capability and reflects an efficiency of converting electrical energy into mechanical energy. The suction efficiency equals a ratio of a suction power to an input power, in which the input power refers to electrical energy input by a fan motor, and the suction power equals a product of an air volume and a vacuum degree. After the input power increases to a certain value, the air volume inhaled is generated. As the input power increases, the air volume increases and the vacuum degree decreases, but the suction power first increases and then decreases, so the input power works in a range to keep the suction power relatively high.

For the same input power, the greater the air volume and the vacuum degree are, the higher the suction efficiency may become. The reduction in loss of the vacuum degree mainly depends on the avoidance of air leakage, i.e. a sealing process. The reduction in loss of the air volume mainly depends on a smooth air path structure without abrupt changes, specifically depending on whether air from a lower end of the main brush enters the air channel without loss, the number of times of reflecting the air by great angles in a process of the air being blown from the lower end of the main brush towards the dust box and then into the fan, and whether a great deal of turbulence is generated when a sectional area of the air channel changes. The overall structure of the air path is designed as an organic whole, and a structure change of one component will lead to a huge change in the dust-collection efficiency of the whole device.

As the main brush is used as the main brush assembly 1, the larger its width is, the greater the width of a single clean-up is. However, the dust box is used as the dust box assembly 2, it is disposed within the housing along with the travel wheel and other components, so its width is restricted and cannot be too large. Furthermore, in order to improve a vacuum net pressure to suck the rubbish into the dust box, an inlet of the dust box cannot be too wide, and hence the first air channel exists between the main brush and the dust box and has a tapered section. An outlet of the dust box is provided with a filter screen for filtering air, and a section of the outlet of the dust box is usually large to prevent blockage of the filter screen from affecting smoothness of the air channel, while a diameter of an inlet of the fan which is used as the power unit 3 is much smaller than that of the outlet of the dust box, such that the second air channel exists between the dust box and the fan and also has a tapered section. These two air channels are adopted in the air path of some autonomous cleaning devices at present, but an optimal air path where the two air channels are optimized is not employed.

Actually, the air path includes the main brush, the dust box, the fan and even two air channels with tapered sections, but the difference in the shape of the air channel makes the suction efficiency quite different.

The air path structure in the present disclosure allows air to enter the air channel from the floating lower end of the main brush. Since the floating main brush may be tightly fitted with the ground in areas to be cleaned and having different heights, the loss of the air volume is little. The floating main brush is realized by a soft material property of the primary air channel and a structural design which enables the main brush to extend and retract up and down as the landform varies.

The wind enters the primary air channel through a main brush accommodating chamber, and a shape of the primary air channel allows a net pressure value of the wind to increase smoothly, thus obliquely moving the rubbish upwards into the dust box. An inclination degree of the primary air channel enables the air to be reflected by a large reflection angle at a top of the dust box and to further leave the dust box, after the air enters the dust box. The rubbish entering the dust box falls to a bottom of the dust box under gravity, and the air that is obliquely moving upwards and reflected by the large reflection angle at the top of the dust box is blown out of the filer screen and then enters the secondary air channel. A design purpose of the secondary air channel is to make the air blown out of the filter screen enter a fan port in a certain direction with as little loss as possible.

Various structures in the cleaning module are described in detail.

1. Structure of Main Brush Assembly 1

FIG. 16 is a perspective view of a main brush module in the main brush assembly, and FIG. 17 is an exploded view of the main brush module shown in FIG. 16 (FIG. 17 is observed in a view angle from the bottom up along the axis z). As shown in FIGS. 16-19, the main brush module includes a main brush 11 and a main brush chamber 13, and the main brush chamber 13 further includes a floating system holder 131 and a main brush casing 132.

1) Main Brush 11

Figure 18:
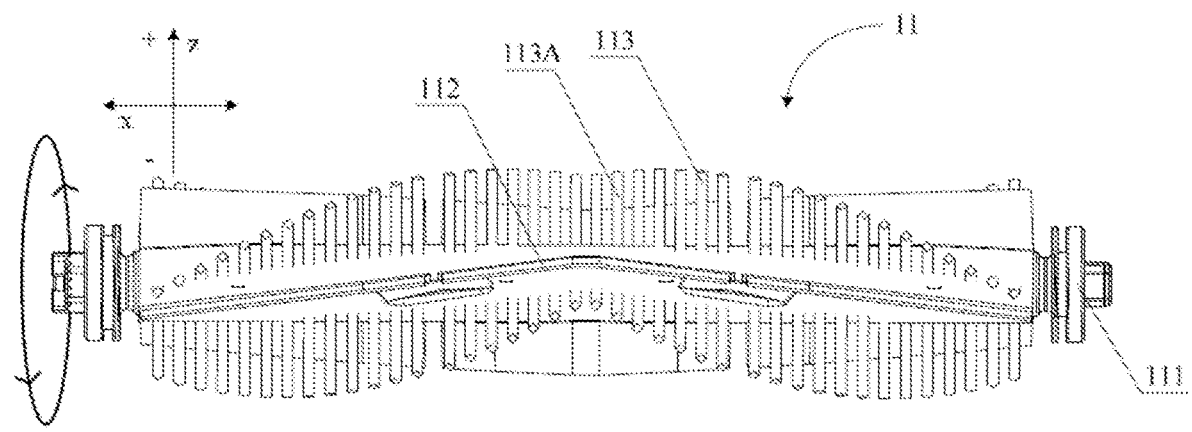
FIG. 18 is a schematic view of a main brush of the main brush module shown in FIG. 16.

FIG. 18 is a schematic view of the main brush 11. As shown in FIG. 18, the main brush 11 in the main brush assembly may be a rubber and hair integrated brush, i.e. a rotating shaft 111 of the main brush 11 is provided with a rubber brush member 112 and a hair brush member 113 simultaneously, so as to be suitable for various cleaning environments, such as floors and blankets. Growing directions of rubber pieces of the rubber brush member 112 and growing directions of hair tufts of the hair brush member 113 are substantially consistent with radial directions of the rotating shaft 111. An entire width of the rubber pieces of the rubber brush member 112 and an entire width of the hair tufts of the hair brush member 113 are substantially consistent with a width of an inlet end 41 of the primary air channel 4. In FIG. 18, a row with its middle part curved upwards slightly represents one rubber brush member 112, a row in a wavy shape represents one hair brush member 113, and each main brush 11 may include at least one rubber brush member 112 and at least one hair brush member 113.

The rubber brush member 112 and the hair brush member 113 are not arranged in a parallel manner or an approximately parallel manner. Instead, a relatively large included angle is formed between the rubber brush member 112 and the hair brush member 113 to enable them to realize their own application functions.

(1) Rubber Brush Member 112

Since relatively large gaps exist among hair tufts 113A of the hair brush member 113, the wind is easily lost from the gaps, thereby resulting in less contribution to formation of a vacuum environment. Thus, by providing the rubber brush member 112, an wind-gathering effect may be generated, to assist in sweeping the objects to be cleaned when an wind-gathering strength reaches a preset strength, such that the objects to be cleaned may be transmitted to the dust box assembly 2 more conveniently under the sweeping of the main brush 11 and the blowing of the wind.

For example, in the embodiment shown in FIG. 18, the rubber brush member 112 is arranged in such a manner that the rubber brush member 112 is arranged along an approximately straight line in a cylindrical surface of the main brush 11 and is curved, at its middle position, in a direction opposite to a rolling direction of the main brush 11, i.e., the rubber brush member 112 has a first deviation angle, which is relatively small, along a circumferential direction of the rotating shaft 111 in the cylindrical surface of the main brush 11, such that the wind generated by the power unit 3 gathers in the middle position where the rubber brush member 112 is curved, so as to enable the rubber brush member 112 to collect the objects to be cleaned. Additionally, as shown in FIG. 17, the floating system holder 131 has an arc-shaped structure 1311 for guiding the air path and extending from an air intake position (i.e. a lower end in FIG. 17) to the primary air channel 4, and the arc-shaped structure 1311 has a same curvature as an arc-shape portion 40 of the primary air channel 4, such that the arc-shaped structure 1311 improves the efficiency of the wind entering the air channel, and reduces the loss of air volume.

(2) Hair Brush Member 13

In the embodiment of the present disclosure, the hair brush member 113 (i.e., adjacent hair tufts 113A) has a second deviation angle, which is relatively large, along the circumferential direction of the rotating shaft 111 in the cylindrical surface of the main brush 11. For each hair brush member 113, by providing the relatively large deviation angle, when hair tufts 113A of the hair brush member 113 are arranged sequentially along the axial direction of the rotating shaft, a greater angle of coverage over the main brush 11 is achieved in the circumferential direction. For example, the circumferential angle of coverage over the main brush 11 reaches a preset angle.

On one hand, by enlarging the circumferential angle of coverage over the main brush 11, a cleaning degree and a cleaning efficiency may be improved. The main brush 11 cleans the ground in a rolling process thereof, however only when the circumferential angle of coverage over the main brush 11 by the hair brush member 113 reaches 360 degrees, can it be ensured that the main brush 11 implements the cleaning operation throughout the rolling process.

On the other hand, the hair brush member 113 needs to touch the ground for sweeping in the cleaning process, in which the hair brush member 113 has a certain deformation due to its soft characteristics and hence generates a "support" effect on the whole autonomous cleaning device. If the circumferential angle of coverage over the main brush 11 by the hair brush member 113 is not sufficient, a height difference is formed between an area within the circumferential coverage and an area out of the circumferential coverage, thus leading to jolt and shake of the autonomous cleaning device in the axis z and affecting the implementation of the cleaning operation. Therefore, when the hair brush member 113 is able to achieve a 360-degree circumferential coverage over the main brush 11, the jolt and shake of the main brush 11 may be eliminated, which ensures that the autonomous cleaning device maintains a continuous and stable output, reduces noises generated by the autonomous cleaning device, avoids impact to the motor, and prolongs a service life of the autonomous cleaning device.

2) Main Brush Casing 122

Figure 19:
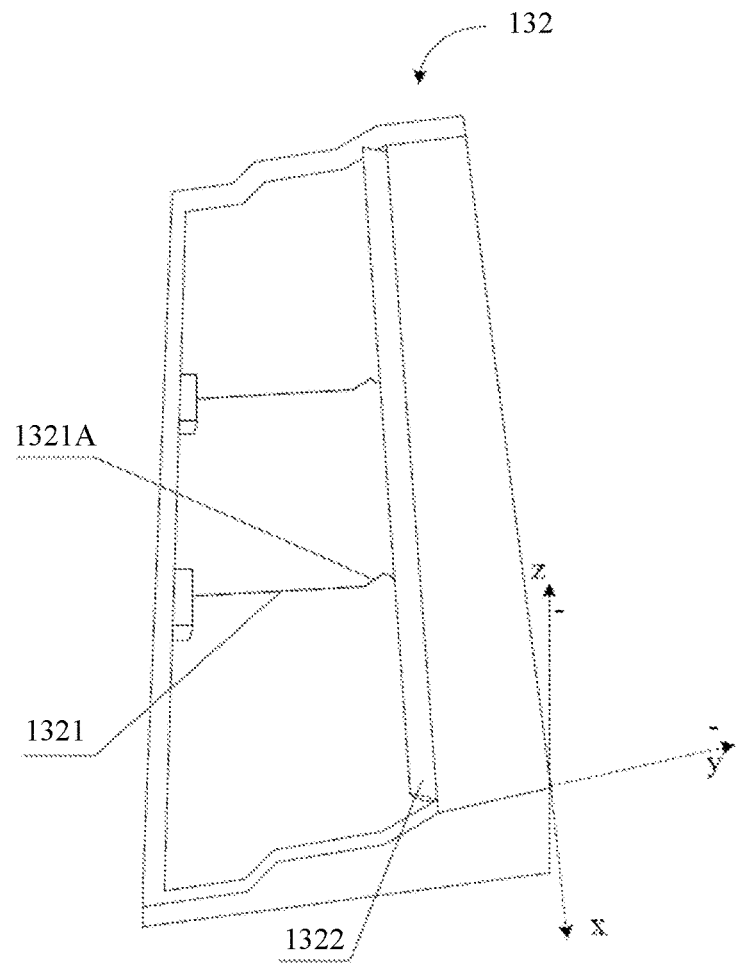
FIG. 19 is a perspective view of a main brush casing of the main brush module shown in FIG. 16.

FIG. 19 shows a perspective view of the main brush casing 132 in such main brush assembly. This main brush casing 132 may include an anti-winding guard 1321 and a flexible rubber wiping strip 1322 located behind the anti-winding guard 1321 in the advancing direction. On one hand, the anti-winding guard 1321 may block the objects having big sizes from entering the air channel and blocking the air channel, and on the other hand, the anti-winding guard 1321 may also block elongated objects, such as wires, from entering the main brush chamber 13 and resulting in winding.

With reference to FIG. 16, it can be known that the main brush casing 132 is located below the main brush 11 along the axis z, and blocks the oversized objects from being carried into the main brush assembly and affecting the normal cleaning operation. The flexible rubber wiping strip 1322 is located below the anti-winding guard 1321 in the axis z and at a tail end of the main brush casing 132 along the advancing direction, such that the flexible rubber wiping strip 1322 maintains a certain distance (like 1.5 to 3 mm) away from the main brush 11. Moreover, the flexible rubber wiping strip 1322 is closely fitted with the ground to intercept and collect a small number of objects to be cleaned that have not been directly swept up by the main brush 11, such that the small number of objects may be carried along between the main brush 11 and the main brush chamber 13, and thus enter the primary air channel 4, under the sweeping of the main brush 11 and the blowing of the wind. The position and angle of the flexible rubber wiping strip 1322 are selected in such a manner that the objects to be cleaned are always located at optimal cleaning and suction positions, thereby preventing any rubbish from being left after the cleaning of the flexible rubber wiping strip 1322.

As shown in FIG. 19, at a tail end of the anti-winding guard 1321 along the advancing direction, i.e. a right end of the anti-winding guard 1321 the anti-winding guard 1321 may be provided with an obstacle-crossing assisting member 1321A in cooperation with the advancing direction of the autonomous cleaning device. On one hand, the obstacle-crossing assisting member 1321A may assist the autonomous cleaning device in surmounting obstacles, and on the other hand, the obstacle-crossing assisting member 1321A may abut against an upper surface of the flexible rubber wiping strip 1322, so as to make a bottom edge of the flexible rubber wiping strip 1322 always closely fitted with a surface to be cleaned (such as the ground, a table top, etc.) when the autonomous cleaning device is in the working state, and further to prevent the flexible rubber wiping strip 1322 from being rolled up by the obstacles (like rubbish) on the surface to be cleaned, thereby guaranteeing a subsequent cleaning effect.

In an embodiment, the obstacle-crossing assisting member 1321A may be configured as a protrusion protruding downwards (i.e. along a negative direction of the axis z, shown as "up" in FIG. 19) from the tail end of the anti-winding guard 1321 along the advancing direction.

3) Floating System Holder 131

Figure 20:
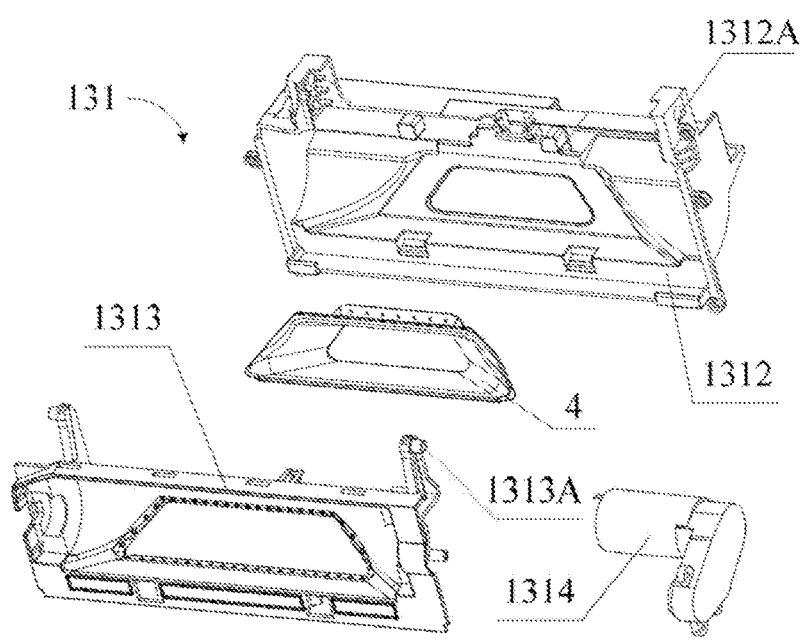
FIG. 20 is an exploded view of a floating system holder of the main brush module shown in FIG. 16.

As shown in FIG. 20, the floating system holder 131 may include a fixed holder portion 1312 and a floating holder portion 1313, and is further provided with the primary air channel 4 and a main brush motor 1314. Two mounting holes 1312A are provided in the fixed holder portion 1312 in a left-and-right direction, and two mounting shafts 1313A are provided to the floating holder portion 1313 in the left-and-right direction, such that the floating holder portion 1313 can "float" along the up-and-down direction by position limitation and rotation fit between each mounting shaft 1313A and the corresponding mounting hole 1312A.

Therefore, when the autonomous cleaning device is in a normal sweeping process, the floating holder portion 1313 rotates to the lowest position under gravity, and regardless of the floor, the blanket or other unsmooth surfaces to be cleaned, the main brush 11 mounted in the floating system holder 131 may be closely fitted with the surface to be cleaned within a floating path range of the main brush 11, thus realizing the most efficient sweeping in a ground-close-fit manner (i.e., being closely fitted with the ground during sweeping). That is, the main brush 11 has a great ground-close-fit effect regarding different types of surfaces to be cleaned, and hence makes significant contribution to air-tightness of the air channel.

When an obstacle 6 exists on the surface to be cleaned, through the upward and downward "floating" of the floating holder portion 1313, mutual interaction between the main brush 11 and the obstacle 6 may be reduced, so as to assist the autonomous cleaning device in surmounting the obstacle easily. The primary air channel 4 is located between the fixed holder portion 1312 and the floating holder portion 1313, so the floating main brush 11 proposes a requirement for flexibility of the primary air channel 4, because a rigid air channel cannot absorb floating changes of the main brush 11, and the requirement is realized by soft materials of the primary air channel 4. Thus, when the primary air channel 4 is made of the soft materials (e.g. soft rubber), in an obstacle-crossing process, the floating holder portion 1313 extrudes the primary air channel 4 and cause deformation of the primary air channel 4, so as to realize the upward "floating" smoothly.

Additionally, in the normal sweeping process, as for a rough surface to be cleaned, like the blanket, the "floating" function of the floating holder portion 1313 may reduce mutual interference between the main brush 11 and the blanket, thus reducing resistance against the main brush motor 1314, so as to decrease power consumption of the main brush motor 1314 and prolong a service life thereof.

2. Structure of Primary Air Channel 4

In the present disclosure, through guidance of the primary air channel 4, the wind generated by the power unit 3 may transmit the objects to be cleaned, such as dust swept up by the main brush assembly 1, into the dust box assembly 2.

In terms of the overall structure, as shown in FIG. 21, the primary air channel 4 may be configured to have a flared shape, and a sectional area of the primary air channel 4 corresponding to any position on the primary air channel 4 is in a negative relationship with a distance between the any position and the main brush assembly 1. In other words, a relatively large side of the "flared" shape faces the main brush assembly 1, while a relatively small side thereof faces the dust box assembly 2.

In this embodiment, the sectional area of the primary air channel 4 gradually decreases from the main brush assembly 1 to the dust box assembly 2, a static pressure at the corresponding position along the primary air channel 4 is gradually increased therewith, i.e. the suction force becomes greater and greater from the main brush assembly 1 to the dust box assembly 2. Thus, after the objects to be cleaned, such as dust and rubbish, are swept up and brought to the primary air channel 4 by the main brush assembly 1, the objects to be cleaned gradually depart from the main brush assembly 1 and approach to the dust box assembly 2 (similarly approaching to the power unit 3 gradually). Although a sweeping force exerted on the objects to be cleaned by the main brush assembly 1 decreases gradually, the suction force exerted on the objects to be cleaned by the power unit 3 increases gradually, such that it is ensured that the objects to be cleaned can be sucked and transmitted into the dust box assembly 2.

Figure 22:
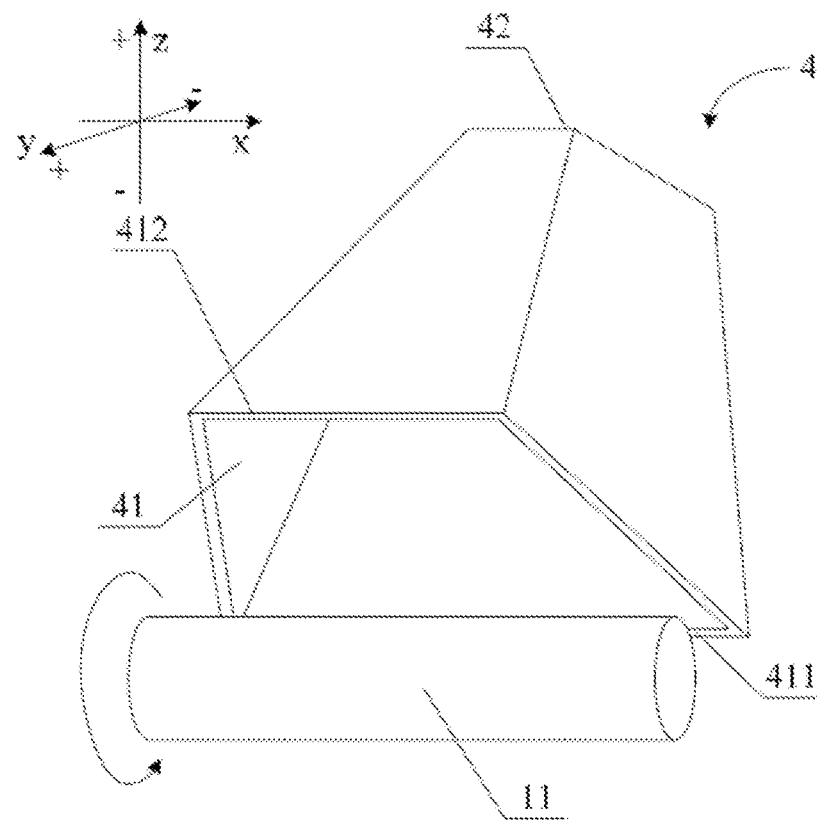
FIG. 22 is a perspective view of a primary air channel fitted with a main brush according to an illustrative embodiment.

Further, as shown in FIG. 21, the inlet end 41 of the primary air channel 4 faces the main brush 11 of the main brush assembly, and a width of the inlet end 41 in a horizontal plane along a direction (i.e. the axis x) perpendicular to the advancing direction is increased gradually from up to down. For ease of understanding, regarding the fit relationship between the primary air channel 4 and the main brush 11 shown in FIG. 21, FIG. 22 shows a perspective view of the primary air channel 4 fitted with the main brush 11. As shown in FIG. 22, the inlet end 41 of the primary air channel 4 close to the main brush 11 has a larger sectional area, while an outlet end 42 thereof away from the main brush 11 has a smaller sectional area. Based on the above "gradually increased" width of the inlet end 41, a section of the inlet end 41 may have a trapezoid shape, a narrower second edge 412 of the inlet end 41 is an upper bottom edge of the trapezoid, and a wider first edge 411 of the inlet end 41 is a lower bottom edge of the trapezoid. Certainly, the section of the inlet end 41 may have other shapes as well, as long as the above "gradually increased" width is satisfied, which is not limited in the present disclosure.

In the embodiment, the inlet end 41 of the primary air channel 4 adopts the trapezoid shape or similar shapes that meet the above "gradually increased" width, such that the static pressure at the corresponding position in the inlet end 41 increases accordingly. Hence, when the objects to be cleaned, such as dust and rubbish, are swept up and brought to the inlet end 41 by the main brush 11, the wind generated by the power unit 3 may provide sufficient suction force, such that the objects swept to the inlet end 41 may be sucked into the dust box assembly 2 as much as possible, which is conductive to improving the cleaning efficiency.

Figure 23:
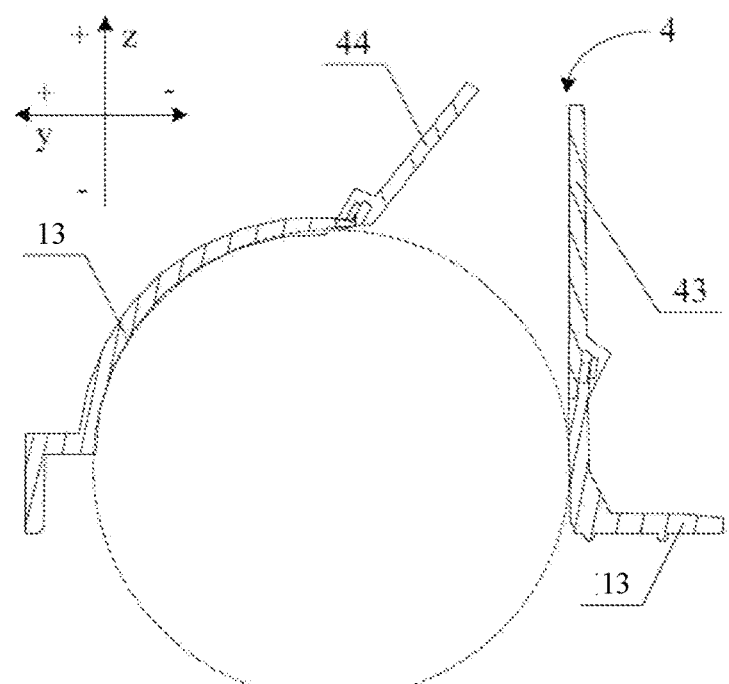
FIG. 23 is a sectional view of a primary air channel fitted with a main brush chamber according to an illustrative embodiment.

As shown in FIG. 21, the inlet end 41 of the primary air channel 4 may be connected to the main brush chamber 13 of the main brush assembly 1. As shown in FIG. 23, the primary air channel 4 includes two side walls in a rolling direction of the main brush 11, i.e. a first side wall 43 located at a rear side in the advancing direction, and a second side wall 44 located at a front side in the advancing direction, and the two side walls may be configured as follows.

1) First Side Wall 43

In an embodiment, the first side wall 43 may be provided along a tangential direction of a circular section region of the main brush chamber 13. For example, as shown in FIG. 23, the main brush chamber 13 may include multiple portions in section, such as a left arc-shaped structure and a right L-shaped structure, in which an arc portion of the left arc-shaped structure corresponds to a circular dotted region shown in FIG. 23, so the circular dotted region corresponding to the arc portion may be equivalent to the above circular section region. Correspondingly, the first side wall 43 of the primary air channel 4 may be provided along a tangential direction of the circular dotted region. For example, in a relative position relationship shown in FIG. 23, since the primary air channel 4 is located obliquely above the main brush assembly and leans to a rear side of the main brush 11 in the advancing direction, the first side wall 43 may be disposed along a vertical direction.

In this embodiment, after the main brush 11 sweeps up the objects to be cleaned from the ground, the objects to be cleaned first move along a gap between the main brush 11 and the main brush chamber 13. As the objects to be cleaned move from the main brush structure to the primary air channel 4, by disposing the first side wall 43 along the above tangential direction, a movement track of the objects to be cleaned and an air flow are not blocked by the first side wall 43, thus ensuring that the objects to be cleaned can smoothly enter the dust box assembly 2 through the primary air channel 4.

2) Second Side Wall 44

In an embodiment, combining FIG. 21 with FIG. 23, the primary air channel 4 leans to the rear side of the main brush 11 in the advancing direction, the inlet end 41 of the primary air channel 4 faces the main brush 11 located obliquely below the front side (e.g. a left side in FIG. 21) of the advancing direction, the outlet end 42 thereof is connected to an air inlet 211 of the dust box assembly 2 located obliquely above the rear side (e.g. a right side in FIG. 21) of the advancing direction, and an air outlet 212 of the dust box assembly 2 is located at a non-top side (i.e. the air outlet 212 is not located at the dust box top 214, and for example, the air outlet 212 is located at a right side wall in FIG. 21).

The second side wall 44 of the primary air channel 4 inclines obliquely rearwards towards the horizontal plane (i.e. approaching the horizontal plane as close as possible), i.e. the second side wall 44 forms an included angle as large as possible with the vertical direction in the axis z. Actually, due to a limited internal space within the autonomous cleaning device, the main brush structure, the primary air channel 4 and the dust box assembly 2 are arranged in a very compact manner, and the most space-saving way is to arrange the primary air channel 4 completely along the axis z, but the air volume will be lost considerably, thereby reducing the suction efficiency greatly. However, in the embodiment of the present disclosure, in the case of limited internal space, by increasing the included angle between the second side wall 44 and the axis z, the wind may be obliquely guided upwards, such that the wind is reflected by the large angle at the dust box top 214 after entering the dust box assembly 2, and is further discharged out in an approximately horizontal direction through the filter screen 22 at the air outlet 212. Such air path design with one large-angle reflection reduces the loss of air volume.

Furthermore, since the inlet end 41 of the primary air channel 4 faces the main brush 11 at a left lower side, and the outlet end 42 thereof is connected to the air inlet 211 of the dust box assembly 2, the wind and entrained objects to be cleaned may be blown directly to the dust box top 214 of the dust box assembly 2 when the primary air channel 4 guides the wind into the dust box assembly 2. Since the air outlet 212 of the dust box assembly 2 is not located at the dust box top 214, when the wind is blown directly towards the dust box top 214, the wind needs to be reflected with a large incident angle at the dust box top 214, and further enters the secondary air channel 5 through the air outlet 212 after an wind direction change. After the wind enters the dust box assembly 2, the sectional area becomes large, so a wind speed is lowered, and the objects to be cleaned fall from the dust box top 214 due to the decrease in the wind speed and remain in the dust box assembly 2. Meanwhile, due to the reduction of the wind speed and the change of the wind direction, the wind cannot continue blowing the objects to be cleaned to the air outlet 212, although the wind itself may be blown to the air outlet 212 and enters the secondary air channel 5, so when the air outlet 212 of the dust box assembly 2 is provided with the filter screen 22, it is possible to prevent the objects to be cleaned from being directly blown to the filter screen 22 and blocking the filter screen 22, thus improving a utilization rate of the air volume.

3. Dust Box Assembly 2

Figure 24:
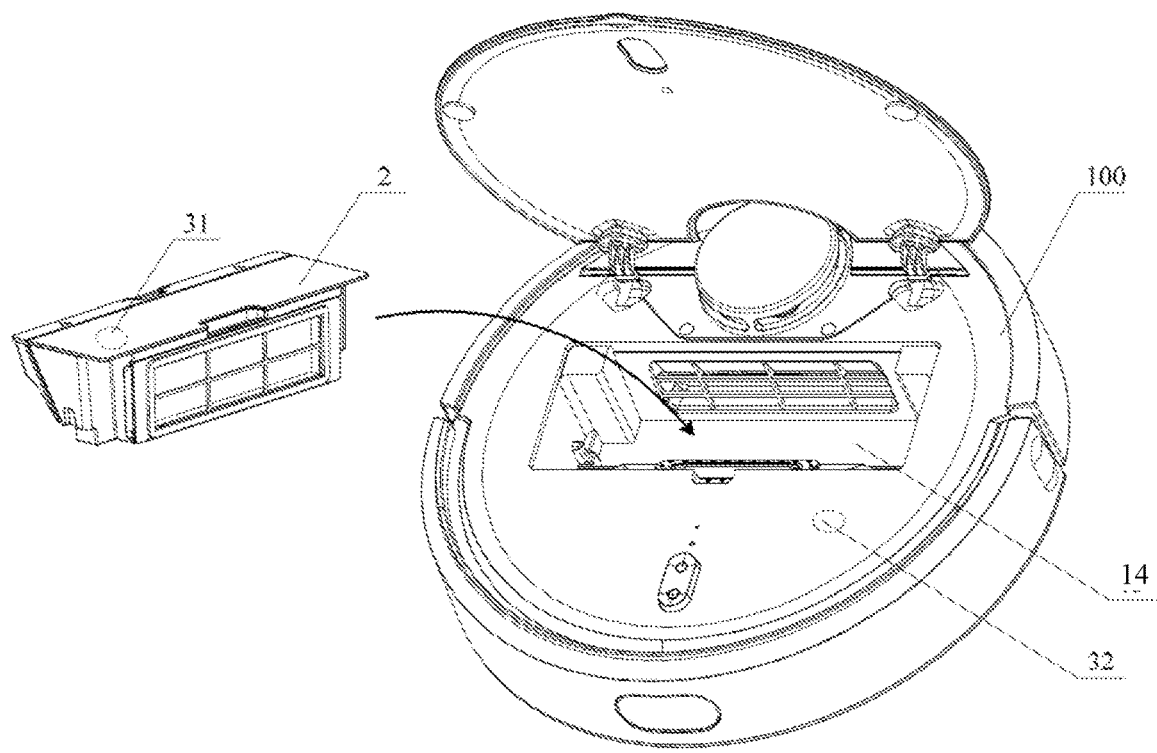
FIG. 24 is an exploded view of an autonomous cleaning device according to an illustrative embodiment.

As shown in FIG. 24, a dust-box accommodating chamber 14 is provided in a top of the device body 110, and the dust box assembly 2 may be placed into the dust-box accommodating chamber 14 to be mounted to the device body 110. Certainly, the dust-box accommodating chamber 14 may be located at other positions of the device body 110, for example, at a side edge in the rear of the device body 110 (referring to a rear side of the axis y shown in FIG. 4), which is limited in the present disclosure.

As shown in FIG. 24, to achieve an in-position detection of the dust box assembly 2, the dust box assembly 2 may be provided with a non-contact inductive element 31, and the device body 110 may be provided with a non-contact inductive cooperating element 32. The non-contact inductive element 31 and the non-contact inductive cooperating element 32 may achieve a non-contact cooperative induction in a certain range, so there is no need of complex mechanical structure and assembling relationship, as long as it is ensured that the non-contact inductive element 31 is in a sensible distance from the non-contact inductive cooperating element 32, the cooperative induction between the both may be realized, thereby realizing the in-position detection of the dust box assembly 2.

Therefore, by configuring the sensible distance between the non-contact inductive element 31 and the non-contact inductive cooperating element 32 in advance, when the dust box assembly 2 is mounted to the device body 110, the non-contact inductive element 31 may cooperate with the non-contact inductive cooperating element 32, and the non-contact inductive cooperating element 32 may sense the non-contact inductive element 31. As a result of a non-contact induction adopted between the both, it is possible to avoid squeezing, breaking, material aging and other unexpected circumstances caused in the assembling process and hence to improve reliability in an application process, compared with a mechanical structure that needs mutual assembling each time.

In an illustrative embodiment, the non-contact inductive element 31 may be a magnetic sheet, and the non-contact inductive cooperating element 32 may be a Hall sensor. By configuring a cooperative relationship between the magnetic field strength of the magnetic sheet and the inductive sensitivity of the Hall sensor, when the dust box assembly 2 is mounted to the device body 110, the Hall sensor may exactly sense the magnetic sheet, so as to realize the in-position detection of the dust box assembly 2 by the magnetic sheet.

Certainly, as said above, the present disclosure does not limit an inductive direction between the non-contact inductive element 31 and the non-contact inductive cooperating element 32, so similar to the above embodiment, the Hall sensor may serve as the non-contact inductive element 31 and be mounted in the dust box assembly 2, and the magnetic sheet may serve as the non-contact inductive cooperating element 32 and be mounted to the device body 110, which may realize the above in-position detection as well and will not be illustrated again.

In the present disclosure, the non-contact inductive element 31 may be mounted at any position in the dust box assembly 2, which is not limited in the present disclosure. Similarly, the non-contact inductive cooperating element 32 may be mounted at any position in the device body 110, which is not limited in the present disclosure, either. However, for the non-contact inductive element 31, by changing its installation position in the dust box assembly 2, different in-position detection effects may be achieved.

Figure 25:
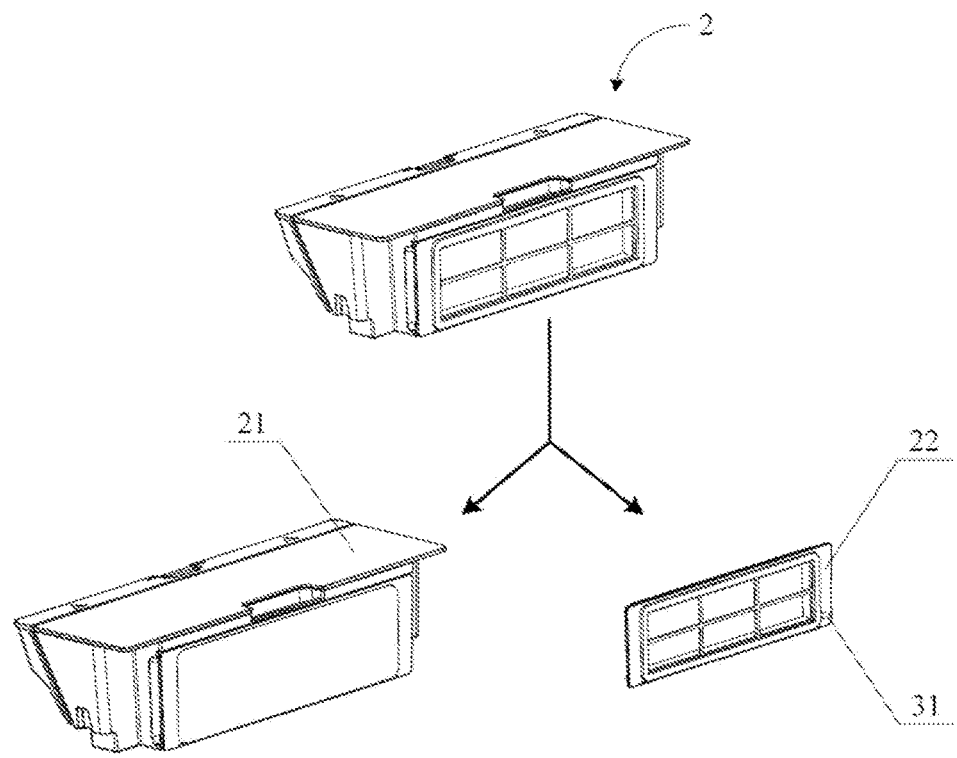
FIG. 25 is an exploded view of another dust box assembly according to an illustrative embodiment.

As shown in FIG. 25, the dust box assembly 2 includes the dust box 21 and the filter screen 22, and the filter screen 22 is detachably mounted to the dust box 21, so there are two ways of mounting the non-contact inductive element 31, i.e. being mounted in the dust box 21 or being mounted to the filter screen 22.

Supposing that the non-contact inductive element 31 is mounted to the filter screen 22, it is impossible for the user to separately mount the filter screen 22 to the device body 110 and overlook the dust box 22, because sizes and shapes of the filter screen 22 and the dust box 21 are greatly different. Thus, there are two installation situations: (1) the user separately mounts the dust box 21 to the device body 110 without mounting the filter screen 22 to the dust box 21, in which case the autonomous cleaning device cannot detect the dust box assembly 2 because the non-contact inductive element 31 is located on the filter screen 22, and hence a detection result is that the dust box assembly 2 is not in position; (2) the user mounts the filer screen 22 to the dust box 21, and the autonomous cleaning device may determine that the dust box assembly 2 is in position after the user mounts the complete dust box assembly 2 to the device body 110.

Therefore, by mounting the non-contact inductive element 31 to the filter screen 22, it is possible to carry out the in-position detection of the whole dust box assembly 2, and also detect the filter screen 22, so as to ensure that the dust box assembly 2 indeed includes the dust box 21 and the filter screen 22 when the autonomous cleaning device obtains a detection result reading that "the dust box assembly 2 is in position", thereby preventing the wind from being blown into the fan structure without being filtered by the filter screen 22, and further preventing dust, granular rubbish and the like from being blown into the fan structure and causing damages to the fan structure. Since the accumulation of dust on the filter screen 22 greatly reduces the air volume and hence affects the dust-collection efficiency, the filter screen 22 often needs to be cleaned by the user to keep a clean air path unobstructed. After cleaning the filter screen 22, the user is most likely to forget to put it back and directly place the dust box 21 into the device body 110, in which case the dust and rubbish may enter the fan structure and cause damages to the fan structure once the autonomous cleaning device is started to sweep. In fact, it is not rare for the autonomous cleaning device, such as a sweeping robot, that the fan therein is ruined just because the filter screen 22 is forgotten to be mounted. Due to a sheet-like structure of the filter screen 22, it is difficult to provide a mechanical element on the filter screen 22 for in-position identification.

Optionally, the non-contact inductive element 31 may be mounted at any position on a frame of the filter screen 22. For example, the magnetic sheet is embedded in a plastic frame of the filter screen 22.

Figure 26:
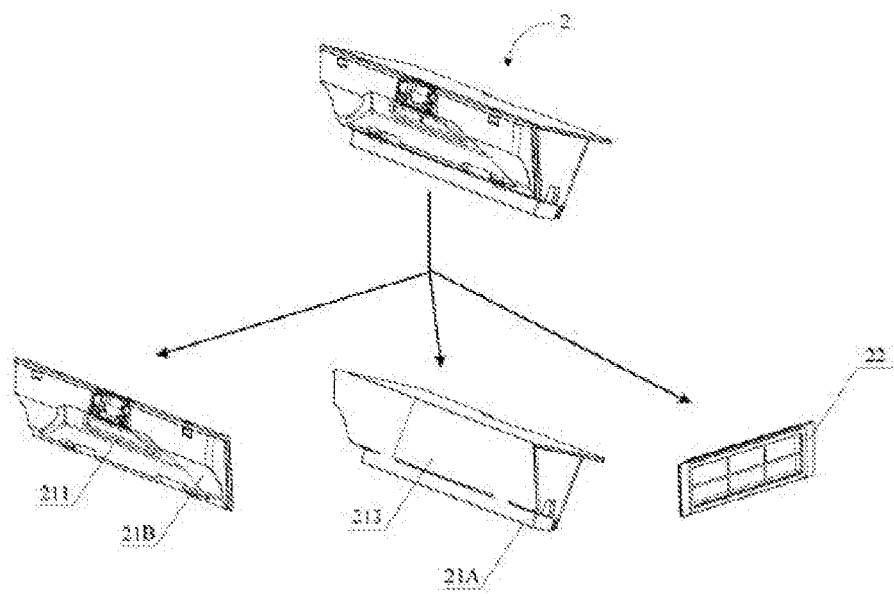
FIG. 26 is an exploded view of another dust box assembly according to an illustrative embodiment.

In the present disclosure, two side openings may be formed in the dust box 21, one side opening is configured as the air inlet 211 in the dust box 21, and the other side opening is configured as the air outlet 212 in the dust box 21, as shown in FIG. 26. The filter screen 22 may be mounted at the air outlet 212, and by covering the air outlet 212 with the filter screen 22, it is ensured that the objects to be cleaned, such as dust, remain in the dust box 21, thus preventing the objects to be cleaned from being blown through the air outlet 212 to the subsequent fan structure.

In an illustrative embodiment, as shown in FIG. 26, the dust box 21 may be further split into a dust box body 21A and a side wall 21B provided with the air inlet 211. Since the air inlet 211 is provided in the side wall 21B, a size of the side wall 21B is necessarily larger than that of the air inlet 211, and thus, after the side wall 21B is removed, a dumping port 213 larger than the air inlet 211 in size may be formed to make it convenient for the user to dump the objects to be cleaned (such as dust) collected in the dust box 21.

4. Smooth Guidance of Secondary Air Channel 5

Figure 27:
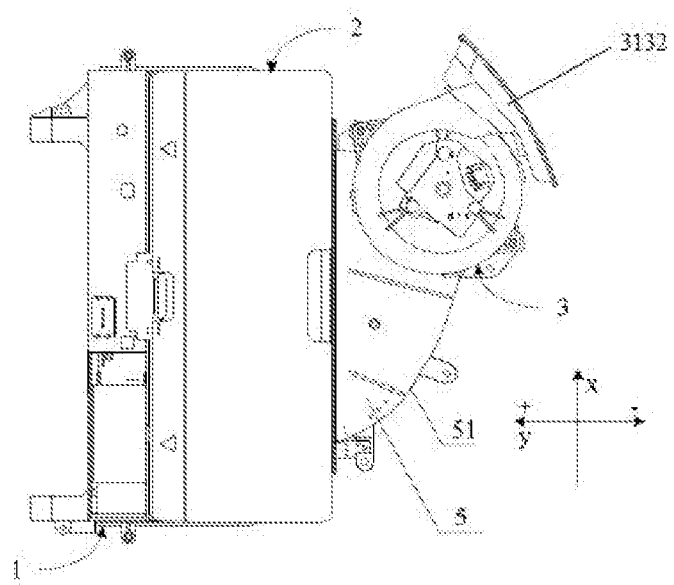
FIG. 27 is a top view of the cleaning module shown in FIG. 21.

FIG. 27 is a top view of the air path structure shown in FIG. 21. As shown in FIG. 27, the main brush assembly 1, the dust box assembly 2 and the power unit 3 are arranged sequentially along the advancing direction (i.e. the axis y) of the autonomous cleaning device, and also, the dust box assembly 2 and the power unit 3 are offset from each other in the axis x (i.e. the left-and-right direction of the autonomous cleaning device), such that when the wind is blown from the dust box assembly 2 to the power unit 3, the wind moves in the axis y (i.e. "from left to right" in FIG. 17) and in the axis x (i.e. "from down to up" in FIG. 17) simultaneously, that is, the wind makes a turn in a flowing process thereof. The dust box assembly 2 and the power unit 3 may not be offset from each other in the axis x, which is not limited in the present disclosure.

As shown in FIG. 27, the secondary air channel 5 has a flared shape (a sectional area of the secondary air channel 5 close to the dust box assembly 2 is relatively large, and a sectional area of the secondary air channel 5 close to the power unit 3 is relatively small) to gather the wind to the air inlet of the power unit 3. When the wind is blown from the dust box assembly 2 to the secondary air channel 5, the wind is directly blown to an inner wall of a windward side 51 of the secondary air channel 5 due to the decrease of the sectional area. Thus, in the present disclosure, the inner wall of the windward side 51 of the secondary air channel 5 is configured to have an arc shape, which on one hand may guide the wind output from the dust box assembly 2 in the axis x to allow the wind to be blown to the air inlet of the power unit 3, and on the other hand cooperate with the wind flow to avoid blocking or interfering the wind flow and resulting in turbulence, thus reducing the airflow loss and improving the utilization rate of the air volume.

Meanwhile, combining FIG. 21 with FIG. 27, after being swept up by the main brush assembly 1, the objects to be cleaned are transmitted to the dust box assembly 2 by the wind generated by the power unit 3 (as well as cooperation of the structure of the primary air channel 4), and hence by improving the utilization rate of the air volume of the air path structure and reducing the airflow loss, a capability of transmitting the objects to be cleaned by the wind may be enhanced, so as to improve the cleaning degree and the cleaning efficiency of the autonomous cleaning device.

5. Oblique Configuration of Power Unit 3

Figure 28:
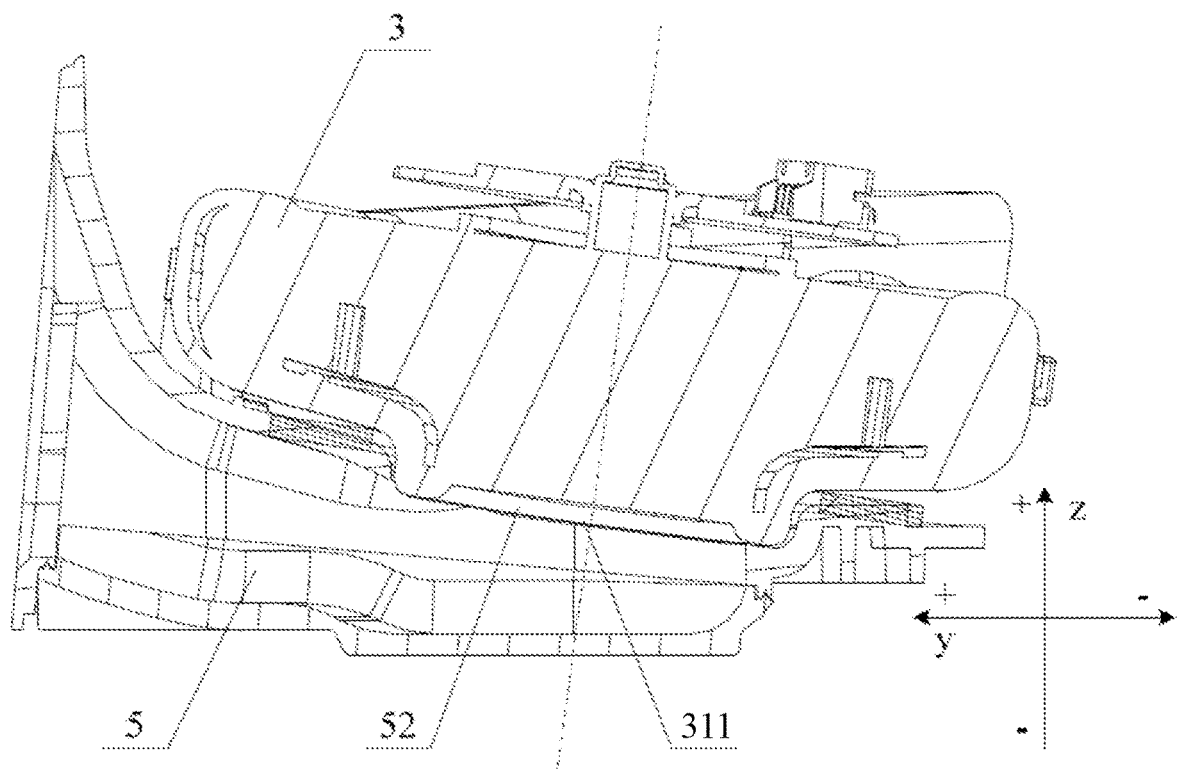
FIG. 28 is a sectional view of a secondary air channel fitted with a power unit according to an illustrative embodiment.

FIG. 28 is a sectional view of a secondary air channel and a power unit according to an illustrative embodiment. As shown in FIG. 28, an end of the secondary air channel 5 away from the dust box assembly 2 (not shown) has an air outlet 52, and the air outlet 52 is fitted with and connected to an air intake 311 of the power unit 3. A plane where the air outlet 52 is located intersects with the horizontal plane, i.e. the air outlet 52 is inclined with respect to the horizontal plane. Thus, when the power unit 3 is configured as an axial-flow fan, and the air intake 311 is oriented in the same direction as a rotating shaft (an axial direction of the rotating shaft may refer to a direction indicated by a dotted line in FIG. 28) of the axial-flow fan, it is actually embodied that the axial-flow fan is inclined with respect to the horizontal plane.

When a plane where the air outlet 52 and the air intake 311 are located is perpendicular to the horizontal plane, in a process that the wind flows inside the secondary air channel 5 and flows from the secondary air channel 5 into the power unit 3, the wind mainly flows in the horizontal plane, such that when the wind is blown from the secondary air channel 5 into the axial-flow fan, the wind direction is substantially parallel to the axial direction of the rotating shaft, and thus the axial-flow fan used as the power unit 3 may achieve a maximum conversion efficiency (e.g. an efficiency of converting electrical energy into wind energy). When the plane where the air outlet 52 and the air intake 311 are located is parallel to the horizontal plane, the wind flows substantially along the horizontal plane inside the secondary air channel 5, but the wind turns to flow along the vertical direction when entering the power unit 3 from the secondary air channel 5, such that the axial-flow fan used as the power unit 3 has a minimum conversion efficiency.

However, due to the limited internal space in the autonomous cleaning device, it is impossible to realize that the plane where the air outlet 52 and the air intake 311 are located is perpendicular to the horizontal plane, so in the present disclosure, by increasing an included angle between the axial-flow fan used as the power unit 3 and the horizontal plane, on one hand, the internal space in the autonomous cleaning device may be utilized reasonably, and on the other hand, the conversion efficiency of the axial-flow fan may be maximized as much as possible.

Figure 29:
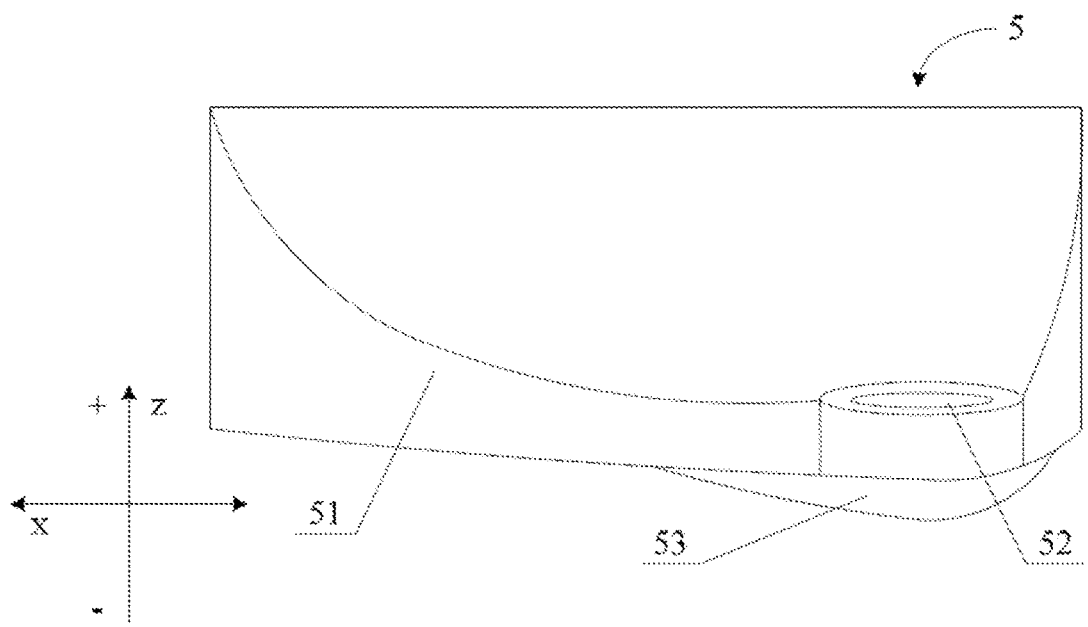
FIG. 29 is a right view of the cleaning module shown in FIG. 21.

In the present disclosure, regarding a process that the wind flows in the secondary air channel 5, a side all of the secondary air channel 5 facing the air outlet 52 may protrude outwards to increase a capacity of an inner chamber of the secondary air channel 5 at the air outlet 52, such that an energy loss of the wind generated by the power unit 3 at the air outlet 52 is less than a predetermined loss. For example, FIG. 29 is a right view of the air path structure shown in FIG. 21. As shown in FIG. 29, when the air outlet 52 is located at a top side of the secondary air channel 5, the side wall of the secondary air channel 5 facing the air outlet 52 is a bottom wall and thus may protrude downwards to form a convex structure 53 as shown in FIG. 29, thereby increasing the capacity of the inner chamber of the secondary air channel 5 at the air outlet 52. Thus, when the wind direction is changed at the air outlet 52 (in the condition that the plane where the air outlet is located is not perpendicular to the horizontal plane) and the wind is blown into the power unit 3, a larger buffer space is provided to reduce the energy loss of the wind at the air outlet 52.

6. Fully Sealed Air Channels of the Whole Device

It can be known from the foregoing analysis that the vacuum degree and the air volume both contribute significantly to a high suction efficiency. In the present disclosure, a sealing treatment is applied to all the gaps at joints of various parts in the air path structure, for example, filling the gaps with flexible glue to avoid air leakage, thus reducing the loss of the vacuum degree. Furthermore, a soft rubber piece is used at the air outlet of the fan to guide the wind completely out of the main machine. The soft rubber piece 3132 avoids the air leakage (i.e. lowering the vacuum degree), and further prevents dust from entering the motor in the autonomous cleaning device, thus extending the service life of the autonomous cleaning device.

Various functional modules of the autonomous cleaning device in the present disclosure are respectively mounted in accommodating spaces reserved in the device body, and may be removed separately from the device body, such that it is convenient to separately remove a damaged functional module to repair it or replace it with a new one, which improves a maintenance efficiency of the autonomous cleaning device greatly.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An autonomous cleaning device, comprising:
   a device body, and
   a drive module, a cleaning module and a sensing module, wherein the sensing module being configured to detect surrounding obstacles, the drive module, the cleaning module and the sensing module are detachably assembled to the device body, respectively,
   wherein the device body comprises a chassis and an upper housing fixed to the chassis, the drive module is provided to the chassis, and the sensing module is assembled in an accommodating chamber in the upper housing, in which the accommodating chamber is matched in shape with the sensing module,
   wherein the device body further comprises a protection cover assembled above the accommodating chamber, so as to form a shell enclosing the sensing module, at least one opening is formed in the protection cover so as not to affect detection of surrounding obstacles by the sensing module,
   wherein the device body further comprises an upper cover assembled to the upper housing, the upper cover having a hole therein, and the sensing module together with the protection cover partially protrudes out of the upper cover through the hole,
   wherein the sensing module is fixed to the upper housing through a plurality of first connecting pieces,
   wherein the protection cover is directly fixed to the upper housing through a plurality of second connecting pieces.

2. The autonomous cleaning device according to claim 1, wherein the opening of the protection cover is in the shape of a strip.

3. The autonomous cleaning device according to claim 1, wherein a waterproof and dustproof hole is provided in a periphery of the sensing module, and the upper housing is provided with a through hole corresponding to the waterproof and dustproof hole.

4. The autonomous cleaning device according to claim 1, wherein the device body further comprises a control unit located below the sensing module, and the sensing module comprises a connector provided at a lower surface of the sensing module and electrically connected with the control unit.

5. The autonomous cleaning device according to claim 1, wherein the device body comprises:
   a forward portion; and
   a rearward portion, the sensing module being located at the rearward portion.

6. The autonomous cleaning device according to claim 1, wherein the drive module comprises:
   a drive wheel module comprising a left drive wheel unit and a right drive wheel unit, the left drive wheel unit and the right drive wheel unit being opposed to each other along a transverse axis defined by the device body.

7. The autonomous cleaning device according to claim 6, wherein the drive module further comprises at least one driven wheel configured to assist in supporting and moving the device body.

8. The autonomous cleaning device according to claim 1, wherein the cleaning module comprises:
   a main brush assembly, a dust box assembly and a power unit arranged sequentially along an advancing direction of the autonomous cleaning device;
   a primary air channel provided between the main brush assembly and the dust box assembly, wherein the primary air channel cooperates with the power unit such that an object to be cleaned by the main brush assembly is conveyed by the wind generated by the power unit to the dust box assembly; and
   a secondary air channel provided between the dust box assembly and the power unit, wherein the windward side of an inner wall of the secondary air channel has an arc shape,
   and the secondary air channel cooperates with the power unit, such that the wind output from the dust box assembly is guided to an air intake of the power unit in a predetermined direction.

9. The autonomous cleaning device according to claim 8, wherein the primary air channel comprises:
   a sectional area corresponding to any position on the primary air channel, the sectional area being in a negative relationship with a distance between the any position and the main brush assembly.

10. The autonomous cleaning device according to claim 9, wherein the secondary air channel comprises:
an air outlet connected to the air intake of the power unit, the power unit being an axial-flow fan and the air intake of the power unit being oriented in a same direction as a rotating shaft of the axial-flow fan.

11. The autonomous cleaning device according to claim 8, wherein the main brush assembly comprises:
a main brush chamber; and
a main brush comprising:
a rotating shaft;
a rubber brush member provided on the rotating shaft, wherein the rubber brush member has a first deviation angle along a circumferential direction of the rotating shaft in a cylindrical surface of the main brush to make a wind-gathering strength of the rubber brush member reach a preset strength;
a hair brush member provided on the rotating shaft, wherein the hair brush member has a second deviation angle along the circumferential direction of the rotating shaft in the cylindrical surface of the main brush, such that when hair tufts of the hair brush member are arranged sequentially along the axial direction of the rotating shaft, a circumferential angle of coverage over the main brush in the cylindrical surface of the main brush reaches a preset angle.

12. The autonomous cleaning device according to claim 11, wherein the rubber brush member is curved at a middle position thereof along the advancing direction, such that the wind generated by the power unit collects the object to be cleaned in the middle position of the rubber brush member, and the middle position of the rubber brush member reaches the primary air channel later than other positions thereof when the autonomous cleaning device advances.

13. The autonomous cleaning device according to claim 8, wherein the dust box assembly comprises:
a dust box comprising at least two side openings, one side opening being an air inlet of the dust box and the other side opening being an air outlet of the dust box;
a filter screen mounted at the air outlet of the dust box for covering the air outlet of the dust box.

14. The autonomous cleaning device according to claim 13, wherein the sensing module is disposed adjacent to the dust box.

15. An autonomous cleaning device, comprising:
a device body; and
a drive module, a cleaning module and a sensing module, the sensing module being configured to detect surrounding obstacles, wherein the drive module, the cleaning module and the sensing module are detachably assembled to the device body, respectively,
wherein the device body comprises a chassis and an upper housing fixed to the chassis, the drive module is provided to the chassis, and the sensing module is assembled in an accommodating chamber in the upper housing, in which the accommodating chamber is matched in shape with the sensing module,
wherein the device body further comprises a protection cover assembled above the accommodating chamber, the protection cover and the upper housing are configured as separate members, the protection cover is directly fixed to the upper housing by a connecting piece, the protection cover encloses and covers the sensing module, a circumferential side of the protection cover is hollowed out, and the sensing module is located between the accommodating chamber and the protection cover, in which a part of the sensing module is received in the accommodating chamber, and rest of the sensing module is received in the protection cover and covered by the protection cover,
wherein the device body further comprises an upper cover assembled to the upper housing, the upper cover having a clearance hole therein, and the sensing module together with the protection cover partially protrudes out of the upper cover through the clearance hole,
wherein the cleaning module comprises:
a main brush assembly, a dust box assembly and a power unit arranged sequentially along an advancing direction of the autonomous cleaning device;
a primary air channel provided between the main brush assembly and the dust box assembly, wherein the primary air channel cooperates with the power unit such that an object to be cleaned by the main brush assembly is conveyed by the wind generated by the power unit to the dust box assembly; and
a secondary air channel provided between the dust box assembly and the power unit, wherein the windward side of an inner wall of the secondary air channel has an arc shape, and the secondary air channel cooperates with the power unit such that the wind output from the dust box assembly is guided to an air intake of the power unit in a predetermined direction,
wherein the primary air channel comprises:
a sectional area corresponding to any position on the primary air channel, the sectional area being in a negative relationship with a distance between the any position and the main brush assembly,
wherein the secondary air channel comprises:
an air outlet connected to the air intake of the power unit, the power unit being an axial-flow fan and the air intake of the power unit being oriented in a same direction as a rotating shaft of the axial-flow fan,
wherein the Main brush assembly comprises:
a main brush chamber; and
a main brush comprising:
a rotating shaft;
a rubber brush member provided on the rotating shaft, wherein the rubber brush member has a first deviation angle along a circumferential direction of the rotating shaft in a cylindrical surface of the main brush to make a wind-gathering strength of the rubber brush member reach a preset strength;
a hair brush member provided on the rotating shaft, wherein the hair brush member has a second deviation angle along the circumferential direction of the rotating shaft in the cylindrical surface of the main brush, such that when hair tufts of the hair brush member are arranged sequentially along the axial direction of the rotating shaft, a circumferential angle of coverage over the main brush in the cylindrical surface of the main brush reaches a preset angle,
wherein the rubber brush member is curved at a middle position thereof along the advancing direction, such that the wind generated by the power unit collects the object to be cleaned in the middle position of the rubber brush member, and the middle position of the rubber brush member reaches the primary air channel later than other positions thereof when the autonomous cleaning device advances.

* * * * *